United States Patent
Liang et al.

(10) Patent No.: US 11,641,616 B2
(45) Date of Patent: May 2, 2023

(54) ACCESS CONTROL METHOD, COMMUNICATIONS DEVICE, AND BASE STATION

(71) Applicant: Huawei Technologies Co., Ltd., Shenzhen (CN)

(72) Inventors: Jinyao Liang, Shenzhen (CN); Tingting Geng, Shanghai (CN); Mingzeng Dai, Shenzhen (CN); Rui Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 244 days.

(21) Appl. No.: 17/096,594

(22) Filed: Nov. 12, 2020

(65) Prior Publication Data
US 2021/0076303 A1 Mar. 11, 2021

Related U.S. Application Data

(63) Continuation of application No. PCT/CN2019/086210, filed on May 9, 2019.

(30) Foreign Application Priority Data
May 17, 2018 (CN) .......................... 201810475264.0

(51) Int. Cl.
*H04W 48/06* (2009.01)
*H04W 48/10* (2009.01)

(52) U.S. Cl.
CPC ........... *H04W 48/06* (2013.01); *H04W 48/10* (2013.01)

(58) Field of Classification Search
CPC ..... H04W 48/16; H04W 48/08; H04W 76/27; H04W 48/06; H04W 76/20; H04W 76/10; H04W 28/0289; H04W 28/08
See application file for complete search history.

(56) References Cited

U.S. PATENT DOCUMENTS

2017/0048760 A1* 2/2017 Vajapeyam ....... H04W 36/0083
2017/0135025 A1* 5/2017 Koskinen .............. H04W 48/02
(Continued)

FOREIGN PATENT DOCUMENTS

CN 101453770 A 6/2009
CN 107277870 A 10/2017
(Continued)

OTHER PUBLICATIONS

ZTE Corporation, "Remaining issues of supporting CEL-based access barring", 3GPP Draft, 3GPP TSG-RAN WG2 Meeting #101bis, R2-1807671, XP051464839, total 13 pages, 3rd Generation Partnership Project, Valbonne, France (May 21-25, 2018).
(Continued)

*Primary Examiner* — Dung Hong
(74) *Attorney, Agent, or Firm* — Leydig, Voit & Mayer, Ltd.

(57) ABSTRACT

Embodiments of this application disclose an access control method, a communications device, and a base station, so that a UE determines, based on a UAC parameter determined based on a CE-level, whether access of the UE is barred, so that a probability that a UE with a large resource consumption amount accesses a communications network system can be controlled. The method in the embodiments of this application includes: determining, by user equipment UE based on a first coverage enhancement level CE-level, a first unified access control UAC parameter corresponding to the first CE-level; and determining, by the UE based on the first UAC parameter, whether access of the UE is barred.

18 Claims, 8 Drawing Sheets

(56) References Cited

U.S. PATENT DOCUMENTS

| | | | | |
|---|---|---|---|---|
| 2019/0357119 A1* | 11/2019 | Hong | ................... | H04W 48/02 |
| 2020/0084799 A1* | 3/2020 | Jiang | ..................... | H04W 48/16 |
| 2020/0275344 A1* | 8/2020 | Byun | ............... | H04W 74/0833 |

FOREIGN PATENT DOCUMENTS

| | | | | |
|---|---|---|---|---|
| CN | 107432042 A | | 12/2017 | |
| CN | 107734595 A | | 2/2018 | |
| CN | 107734597 A | | 2/2018 | |
| WO | WO-2018165909 A1 * | | 9/2018 | ........ H04W 28/0215 |
| WO | WO-2019062481 A2 * | | 4/2019 | ............ H04W 74/00 |

OTHER PUBLICATIONS

Intel Corporation, "CE level based access barring and load control for eFeMTC", 3GPP Draft, 3GPP TSG RAN WG2 Meeting #101 bis, R2-1804898, XP051428600, total 3 pages, 3rd Generation Partnership Project, Valbonne, France (Apr. 16-20, 2018).

Nokia Networks, "Paging of Rel13 low complexity UE and/or UE in EC mode", 3GPP Draft, 3GPP TSG RAN WG2 Meeting #91bis, R2-154550, XP051023643, total 4 pages, 3rd Generation Partnership Project, Valbonne, France (Oct. 5-9, 2015).

Intel Corporation, "CE level based access barring and load control for eFeMTC and FeNB-IoT", 3GPP Draft, 3GPP TSG RAN WG2 Meeting #99, R2-1709044, XP051318837, total 3 pages, 3rd Generation Partnership Project, Valbonne, France (Aug. 21-25, 2017).

Ericsson, "Improved Idle Mode Access control for efeMTC UEs", 3GPP Draft, 3GPP dated WG2 #100, R2-1713068, XP051371896, total 5 pages, 3rd Generation Partnership Project, Valbonne, France (Nov. 27-Dec. 1, 2017).

LG Electronics Inc et al., "Clarification of Access Identity in unified access control", 3GPP Draft, 3GPP TSG-SA WG1 Meeting #81, S1-180526, XP051434303, total 5 pages, 3rd Generation Partnership Project, Valbonne, France (Feb. 5-9, 2018).

"CE level based access barring and load control for eFeMTC," 3GPP TSG RAN WG2 Meeting #99bis, R2-1710644, Prague, Czech Republic, Total 3 pages, 3rd Generation Partnership Project, Valbonne, France (Oct. 9-13, 2017).

"TP on UAC for eLTE," 3GPP TSG-RAN WG2 Meeting #102, R2-1806945, Busan, Korea, pp. 1-28, 3rd Generation Partnership Project, Valbonne, France (May 21-25, 2018).

"Signaling of access control parameters," 3GPP TSG-RAN WG2 #101, Tdoc R2-1802353 (Resubmission of 1800320), Athens, Greece, Total 9 pages, 3rd Generation Partnership Project, Valbonne, France (Feb. 26-Mar. 2, 2018).

* cited by examiner

ACCESS CONTROL METHOD, COMMUNICATIONS DEVICE, AND BASE STATION

CROSS-REFERENCE TO RELATED APPLICATIONS

This application is a continuation of International Application No. PCT/CN2019/086210, filed on May 9, 2019, which claims priority to Chinese Patent Application No. 201810475264.0, filed on May 17, 2018. The disclosures of the aforementioned applications are hereby incorporated by reference in their entireties.

TECHNICAL FIELD

This application relates to the communications field, and in particular, to an access control method, a communications device, and a base station.

BACKGROUND

Access control is a solution to congestion control on a network side. Access control barring (ACB) is a general term for access control in a long term evolution (LTE) system, and unified access control (UAC) is a general term for access control in a fifth generation (5G) mobile communications system, the LTE system, and a 5G core network (5GC). When load on the network side is relatively heavy, an access control mechanism may be used to bar some terminals from initiating access, to restrict the network load. A coverage enhancement level (CE-level) is used to indicate a quantity of times that user equipment repeatedly accesses a communications network system, and the CE-level is usually used for machine type communication (MTC) or in a narrowband internet of things (narrow band internet of things, NB-IoT). Increasing the CE-level may increase the quantity of access repetitions, so that uplink coverage of the communications network system can be increased.

In the 5G system, a currently used access control method is to configure parameters of an access category (AC) and an access identity (AI) in a unified access control (UAC) broadcast parameter. The user equipment then maps an access attempt to the AC, and maps a UE configuration to the access identity AI, and whether access of the user equipment is barred is determined based on the UAC parameter.

However, in a current access control mechanism in the 5G system, because UEs use same signaling when attempting to access the system, any UE that attempts to access the system may succeed. If a UE that uses a large quantity of resources accesses the system in an excessively large quantity, load on the 5G system is excessively heavy.

SUMMARY

Embodiments of this application provide an access control method, so that a UE determines, based on a UAC parameter determined based on a CE-level, whether access of the UE is barred, so that a probability that a UE with a large resource consumption amount accesses a communications network system can be controlled.

A first aspect of the embodiments of this application provides an access control method, including:

when user equipment UE needs to access a communications network, the UE may determine, based on a first coverage enhancement level CE-level, a first unified access control UAC parameter corresponding to the first CE-level, and then determines, based on the first UAC parameter, whether access of the UE is barred; in other words, the UE determines, based on the first UAC parameter, whether an access attempt of the UE is barred. In this specification, whether the access is barred is equivalent to whether the access attempt is barred, and is not limited below.

It can be learned from the foregoing technical solutions that the embodiments of this application have the following advantages: The UE can determine a UAC parameter based on a CE-level when performing access control, a low CE-level corresponds to a small quantity of repetitions and fewer resources to be consumed, and a high CE-level corresponds to a large quantity of repetitions and more resources to be consumed. Therefore, when accessing the network, the UE can determine the corresponding CE-level based on the UAC parameter, to learn of a corresponding resource consumption amount. If the resource consumption amount is large, the UE is barred from accessing a communications network system. In this way, a probability that a UE with a large resource consumption amount accesses the communications network system can be controlled, and more UEs with a small resource consumption amount can access the communications network system.

According to the first aspect of the embodiments of this application, in a first implementation of the first aspect of the embodiments of this application, if determining, based on the first UAC parameter, that the access is barred, the UE may determine, based on a second UAC parameter corresponding to a second CE-level, whether the access is barred, where the second CE-level is higher than the first CE-level.

In this embodiment of this application, the UE may determine, based on the first CE-level, the first UAC parameter corresponding to the first CE-level, and after determining, based on the first UAC parameter, whether the access of the UE is barred, the UE changes the first CE-level to the second CE-level, to successfully access the communications network. Therefore, implementability of this solution is improved.

According to the first implementation of the first aspect of the embodiments of this application, in a second implementation of the first aspect of the embodiments of this application, before an access timer expires, the UE may determine, based on the first UAC parameter, whether the access is barred, and after the access timer expires, the UE may determine, based on the second UAC parameter corresponding to the second CE-level, whether the access is barred.

In this embodiment of this application, the UE may determine, based on the first CE-level, the first UAC parameter corresponding to the first CE-level. When determining, based on the first UAC parameter, whether the access of the UE is barred, the UE simultaneously enables an access controller. When attempting to access the communications network, the UE may determine whether the access controller reaches a preset threshold. If determining that the access controller reaches the preset threshold, the UE may determine, based on the second CE-level, the second UAC parameter corresponding to the second CE-level, where the second CE-level is higher than the first CE-level, and then the UE determines, based on the second UAC parameter, whether the access of the UE is barred.

It should be noted that, before the controller reaches the preset threshold, the UE may already determine the second UAC parameter corresponding to the second CE-level.

According to the first implementation or the second implementation of the first aspect of the embodiments of this application, in a third implementation of the first aspect of the embodiments of this application, if determining, based on the second UAC parameter, that the access is not barred, the UE may perform the access based on the second CE-level, and then, after sending information about the first CE-level, the UE performs signaling transmission based on the first CE-level.

In this embodiment of this application, after successfully accessing the communications network, the UE performs the signaling transmission by restoring a CE-level to an actual CE-level rather than still using a non-actual CE-level. Therefore, the implementability of this solution is improved.

According to the first aspect of the embodiments of this application, in a fourth implementation of the first aspect of the embodiments of this application, the method further includes:

the UE may determine a first access category AC based on the first CE-level and a type that is of an access attempt of the access, and then the UE determines, based on the first UAC parameter and the first AC, whether the access is barred.

In this embodiment of this application, because the UE can determine, based on a UAC parameter and ACs of a plurality of types, whether the access is barred, diversity of implementing this solution is increased, and flexibility of implementing this solution is improved.

According to the first aspect of the embodiments of this application, in a fifth implementation of the first aspect of the embodiments of this application, the method further includes:

the UE may determine a first access identity AI based on the first CE-level and the UE configuration, and then the UE determines, based on the first UAC parameter and the first AI, whether the access is barred, where the UE configuration is a device type of the UE.

In this embodiment of this application, because the UE can determine, based on a UAC parameter and AIs of a plurality of types, whether the access is barred, diversity of implementing this solution is increased, and flexibility of implementing this solution is improved.

According to the fourth implementation of the first aspect of the embodiments of this application, in a sixth implementation of the first aspect of the embodiments of this application, the method further includes:

the UE may determine a first access identity AI based on the first CE-level and the UE configuration, and then the UE determines, based on the first UAC parameter, the first AC, and the first AI, whether the access is barred.

In this embodiment of this application, the UE may determine, based on the first AC, the first AI, and the UAC parameter that corresponds to the first CE-level and that is determined based on the first CE-level, whether the access of the UE is barred. Because the first UAC is determined based on the first CE-level, the network system may control the access of the UE based on a CE-level of the UE. A high CE-level indicates a large quantity of access repetitions in the CE-level, and a large quantity of resources to be used. If such a UE accesses the network, more other UEs cannot access the network. Therefore, there is a higher probability that a UE with a high CE-level is barred from accessing the network, so that more UEs can access the network. In this way, UAC parameters may be separately configured for UEs based on a resource usage amount in access control, to implement more effective congestion control.

According to the first aspect of the embodiments of this application or any one of the fourth to the sixth implementations of the first aspect of the embodiments of this application, in a seventh implementation of the first aspect of the embodiments of this application, a third UAC parameter is a complete set of parameters, a parameter in the third UAC parameter is incomplete, and the UE may determine the first UAC parameter based on the first CE-level and the third UAC parameter that corresponds to a third CE-level. The incomplete described herein means that a value configured in a UAC parameter is not an actual value of the UAC parameter (for example, the UAC parameter may be configured with a differential value), or may mean that a value configured in a UAC parameter is a value that is of one parameter and that is used to derive the UAC parameter (for example, the UAC parameter may be configured with a value of a scale factor). The complete described herein means that a base station configures one UAC parameter defined in the following embodiments.

In this embodiment of this application, when the UE cannot directly learn of the first UAC parameter corresponding to the first CE-level, the UE may determine the first UAC parameter based on the complete third UAC parameter configured for another CE-level, to learn of the CE-level of the UE, and the base station separately configures different UAC parameters based on CE-levels of UEs. In this way, if the CE-level is high, the base station may increase an access probability value, to make it more difficult for the UE to access the network, thereby saving resources and enabling more UEs to access the network.

According to the seventh implementation of the first aspect of the embodiments of this application, in an eighth implementation of the first aspect of the embodiments of this application, the UE may determine the first UAC parameter based on the third UAC parameter, the first CE-level, and a differential value between the third UAC parameter and the first UAC parameter.

In this embodiment of this application, because a UAC parameter is determined based on the differential value, the resources can be further saved, and implementability of this solution is improved.

According to the seventh implementation of the first aspect of the embodiments of this application, in a ninth implementation of the first aspect of the embodiments of this application, the UE may determine the first UAC parameter based on the third UAC parameter, the first CE-level, and a scale factor.

In this embodiment of this application, because a UAC parameter is determined based on the scale factor, the resources can be further saved, and implementability of this solution is improved.

According to the ninth implementation of the first aspect of the embodiments of this application, in a tenth implementation of the first aspect of the embodiments of this application, the scale factor may include a scale factor configured by using a broadcast message, or a predefined scale factor.

In this embodiment of this application, because the scale factor can be obtained in a plurality of manners, the diversity and the flexibility of implementing this solution are improved.

A third aspect of the embodiments of this application provides a base station, including:

the base station may configure a first unified access control UAC parameter for user equipment UE based on a first CE-level. After the UE accesses the base station based on a second CE-level, the base station receives information that is about the first CE-level and that is sent by the UE, and then performs signaling transmission based on the first CE-level, where the second CE-level is higher than the first CE-level.

In this embodiment of this application, after the UE accesses the base station based on the second CE-level, the base station may perform the signaling transmission based on the actual first CE-level obtained based on the information that is about the first CE-level and that is sent by the UE. Therefore, after being barred from accessing the base station by using one CE-level, the UE attempts to access the base station based on another higher CE-level, so that more UEs access the base station, thereby improving practicability of the base station.

A third aspect of the embodiments of this application provides an access control method, including:

the UE may determine, based on a maximum transmit power, a first unified access control UAC parameter corresponding to the maximum transmit power, and then determine, based on the first UAC parameter, whether access of the UE is barred.

In this embodiment of this application, the UE can determine a UAC parameter based on the maximum transmit power when performing access control. A class of the maximum transmit power corresponds to a CE-level, and a lower class of the maximum transmit power indicates a lower CE-level. A low CE-level corresponds to a small quantity of repetitions and fewer resources to be consumed, and a high CE-level corresponds to a large quantity of repetitions and more resources to be consumed. Therefore, when accessing a network, the UE can determine a corresponding CE-level based on the UAC parameter, to learn of a corresponding resource consumption amount. A larger resource consumption amount indicates a higher possibility that the UE is barred when the UE accesses a communications network system. In this way, a probability that a UE with a large resource consumption amount accesses the communications network system can be controlled, and more UEs with a small resource consumption amount can access the communications network system.

According to the third aspect of the embodiments of this application, in a first implementation of the third aspect of the embodiments of this application, the UE may determine a first access category AC based on the maximum transmit power, and a type that is of an access attempt of the access, and then the UE determines, based on the first UAC parameter and the first AC, whether the access is barred.

In this embodiment of this application, whether the access of the UE is barred may be determined based on the UAC parameter and ACs of a plurality of types. Therefore, diversity and flexibility of implementing this solution are improved.

According to the third aspect of the embodiments of this application, in a second implementation of the third aspect of the embodiments of this application, the UE may determine a first access identity AI based on the maximum transmit power and the UE configuration, and the UE determines, based on the first UAC parameter and the first AI, whether the access is barred.

In this embodiment of this application, whether the access of the UE is barred may be determined based on the UAC parameter and AIs of a plurality of types. Therefore, diversity and flexibility of implementing this solution are improved.

According to the first implementation of the third aspect of the embodiments of this application, in a third implementation of the third aspect of the embodiments of this application, the UE may determine a first access identity AI based on the maximum transmit power and the UE configuration, and then the UE determines, based on the first UAC parameter, the first AC, and the first AI, whether the access is barred.

In this embodiment of this application, a level of the maximum transmit power may be learned of based on the first UAC parameter. In addition, values of the first AC and the first AI represent the maximum transmit power. Therefore, when it is determined, based on the first AC, the first AI, and the first UAC parameter, whether the access is barred, UEs with different maximum transmit powers may be distinguished. In this way, access of the UEs with different maximum transmit powers can be adjusted based on congestion on a network side. When congestion occurs on the network side, an access attempt can be performed based on a maximum transmit power at a relatively low level. In this way, an occupied resource usage amount is relatively small, thereby controlling a network resource usage amount.

According to the third aspect of the embodiments of this application or any one of the first to the third implementations of the third aspect of the embodiments of this application, in a fourth implementation of the third aspect of the embodiments of this application, the UE determines the first UAC parameter based on a first maximum transmit power, and a second UAC parameter that corresponds to a second maximum transmit power, where the first maximum transmit power is the maximum transmit power.

In this embodiment of this application, a base station separately configures UAC parameters based on different maximum transmit powers. In this way, the base station can separately control access of the UEs with different maximum transmit powers. Because a resource usage amount of a UE with a low maximum transmit power is usually relatively large, according to this method, the base station can control access of UEs with different resource usage amounts, so that more UEs can access the network.

According to the fourth implementation of the third aspect of the embodiments of this application, in a fifth implementation of the embodiments of this application, the UE may determine the first UAC parameter based on the second UAC parameter, the first maximum transmit power, and a differential value between the second UAC parameter and the first UAC parameter.

In this embodiment of this application, because the UAC parameter is determined based on a differential value, resources can be further saved, and implementability of this solution is improved.

According to the fourth implementation of the third aspect of the embodiments of this application, in a sixth implementation of the embodiments of this application, the UE may determine the first UAC parameter based on the second UAC parameter, the first maximum transmit power, and a scale factor.

In this embodiment of this application, because the UAC parameter is determined based on the scale factor, resources can be further saved, and implementability of this solution is improved.

According to the sixth implementation of the third aspect of the embodiments of this application, in a seventh implementation of the embodiments of this application, the scale factor may include a scale factor configured by using a broadcast message, or a predefined scale factor.

In this embodiment of this application, because the scale factor can be obtained in a plurality of manners, the diversity and the flexibility of implementing this solution are improved.

According to the seventh implementation of the third aspect of the embodiments of this application, in an eighth implementation of the embodiments of this application, the predefined scale factor may be obtained through calculation based on the first maximum transmit power and the second maximum transmit power.

In this embodiment of this application, because there is a specific method for obtaining the scale factor through calculation, the implementability of this solution is improved.

A fourth aspect of the embodiments of this application provides a communications apparatus, where the communications apparatus has a function of implementing behavior of the communications apparatus in the first aspect and the third aspect. The function may be implemented by hardware, or may be implemented by hardware executing corresponding software. The hardware or the software includes one or more modules corresponding to the function.

A fifth aspect of the embodiments of this application provides a base station, where the base station has a function of implementing behavior of the base station in the second aspect. The function may be implemented by hardware, or may be implemented by hardware executing corresponding software. The hardware or the software includes one or more modules corresponding to the function.

A sixth aspect of the embodiments of this application provides a computer storage medium, where the computer storage medium is configured to store a computer software instruction used by the communications apparatus in the fourth aspect, and the computer software instruction includes a program designed for the communications apparatus.

A seventh aspect of the embodiments of this application provides a computer storage medium, where the computer storage medium is configured to store a computer software instruction used by the base station in the fifth aspect, and the computer software instruction includes a program designed for the base station.

An eighth aspect of the embodiments of this application provides a computer program product, where the computer program product includes a computer software instruction, and the computer software instruction may be loaded by a processor to implement the method procedures in the first aspect to the third aspect.

DESCRIPTION OF EMBODIMENTS

Figure 1:
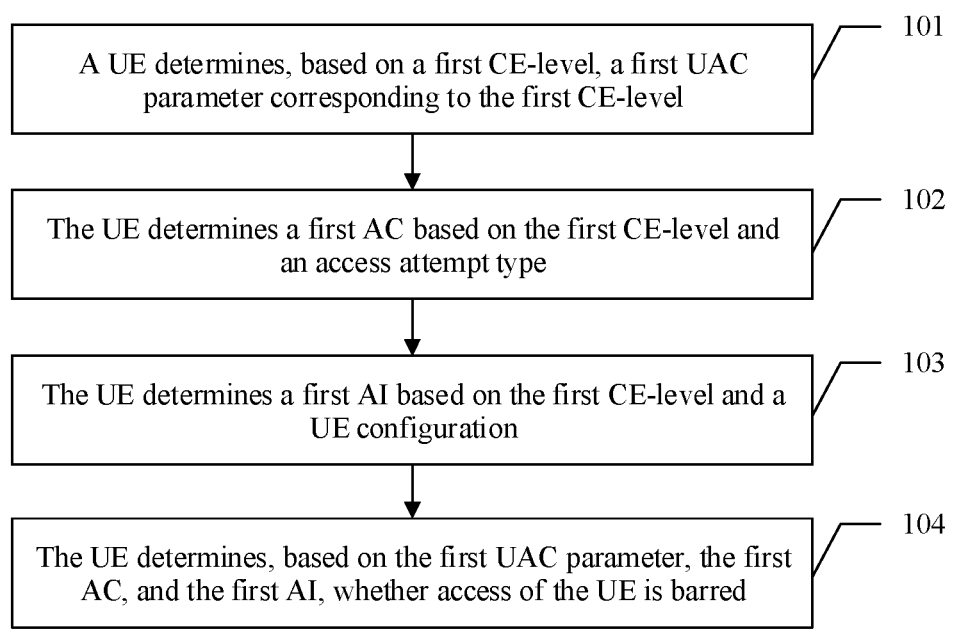
FIG. 1 is a schematic diagram of an embodiment of an access control method according to an embodiment of this application.

In the specification, claims, and accompanying drawings of this application, the terms "first", "second", "third", "fourth", and so on (if used) are intended to distinguish between similar objects but do not necessarily indicate a specific order or sequence. It should be understood that the data termed in such a way are interchangeable in proper circumstances so that embodiments described herein can be implemented in other orders than the order illustrated or described herein.

Embodiments of this application provide an access control method, so that a UE determines, based on a UAC parameter determined based on a CE-level, whether access of the UE is barred, thereby controlling access of the UE, and increasing a quantity of UEs that access a communications network.

In a 5G system, the UE obtains a UAC parameter broadcast on a network side (an example in which a base station is used as the network side is used for description in the embodiments of this application), and then determines, based on the UAC parameter, and an AC and an AI that are configured in the UAC parameter, whether the access of the UE is barred. The following explains professional terms used in the embodiments of this application.

1. AC

Table 1 below is a mapping table in which an access attempt (access attempt) is mapped to an AC. In the 5G system, there are a total of 64 service types of the AC (type of access attempt). The AC is mainly used to distinguish one service type corresponding to the access attempt. Among the 64 ACs, AC 8-31 are referred to as standardized ACs, reserved for future standard extension. AC 32-63 are operator classified ACs, defined by operators. Other ACs correspond to specific services. For example, AC 0 indicates an access attempt resulting from paging, AC 2 indicates an emergency call, AC 3 indicates an access attempt initiated by the UE, and AC 4, AC 5, AC 6, and AC 7 each has a specific description.

When mapping the access attempt to the AC, the UE determines a type of the access attempt, and maps the access attempt to the corresponding AC according to the AC mapping table. For example, the UE determines that the access attempt is a UE call initiated by paging (paging), so that the access attempt corresponds to the AC 0. During UAC determining, the UE determines, based on a value of the AC, whether to initiate the access attempt.

TABLE 1

| Access Category number | Conditions related to UE | Type of access attempt |
| --- | --- | --- |
| 0 | All | MO signaling resulting from paging |

TABLE 1-continued

| Access Category number | Conditions related to UE | Type of access attempt |
|---|---|---|
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signaling resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that does not belong to any other Access Categories |
| 8-31 | | Reserved standardized Access Categories |
| 32-63 (NOTE 2) | All | Based on operator classification |

NOTE 1:
The barring parameter for Access Category 1 is accompanied with information that defines whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.
NOTE 2:
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.

2. AI

There are a total of 16 types of AIs. Table 2 below is a mapping table for mapping a UE configuration (namely, a device type of the UE) to an AI. The UE configuration is a description of the device type of the UE, a configuration type of the UE, and the like, and is configured by the UE based on a characteristic of the UE or based on registration information that is of the UE and that is in a network. For example, the registration information of the UE may indicate configuration information of the UE for a multimedia priority service, or configuration information of the UE for a mission critical service, or configuration information of the UE for a public land mobile network (A public land mobile network, PLMN), a dedicated PLMN, a PLMN list, or the like. The AI is a parameter that is mainly used to distinguish the device type of the UE. AI 3-10 are reserved for future protocol extension. AI 11-15 are configurable by operators. AI 1 and AI 2 respectively indicate that the UE device supports a multimedia service and a critical service.

TABLE 2

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |

TABLE 2-continued

| Access Identity number | UE configuration |
|---|---|
| 14 (NOTE 3) | Access Class 14 is configured in the UE. |
| 15 (NOTE 3) | Access Class 15 is configured in the UE. |

NOTE 1:
Access Identity 1 is used to provide overrides according to the subscription information in UEs configured for MPS. The subscription information defines whether an override applies to UEs within one of the following categories;
a) UEs that are configured for MPS;
b) UEs that are configured for MPS and are in the PLMN listed as most preferred PLMN of the country where the UE is roaming in the operator-defined PLMN selector list or in their HPLMN or in a PLMN that is equivalent to their HPLMN;
c) UEs that are configured for MPS and are in their HPLMN or in a PLMN that is equivalent to it.
NOTE 2:
Access Identity 2 is used to provide overrides according to the subscription information in UEs configured for MCS. The subscription information defines whether an override applies to UEs within one of the following categories;
a) UEs that are configured for MCS;
b) UEs that are configured for MCS and are in the PLMN listed as most preferred PLMN of the country where the UE is roaming in the operator-defined PLMN selector list or in their HPLMN or in a PLMN that is equivalent to their HPLMN;
c) UEs that are configured for MCS and are in their HPLMN or in a PLMN that is equivalent to it.
NOTE 3):
Access Identities 11 and 15 are valid in Home PLMN only if the EHPLMN list is not present or in any EHPLMN. Access Identities 12, 13, and 14 are valid in Home PLMN and visited PLMNs of home country only. For this purpose, the home country is defined as the country of the MCC part of the IMSI.

The AI may be configured on the network side in a bitmap mode. For example, a length of a bitmap for configuring AIs may be 7. This indicates that the bitmap restricts whether access corresponding to seven AIs is barred. For example, the bitmap with the length of 7 restricts seven AIs: AI=1, 2, 11, 12, 13, 14 and 15. In the bitmap, 1 indicates that access corresponding to an AI is not barred, and 0 indicates that access corresponding to an AI is barred. A UE corresponding to the AI indicated by a bitmap does not use a probability value method to determine whether the access is barred. For details, refer to an example in the following paragraph.

3. UAC Restriction Information Set (BarringInfo Set)

For UAC, all UEs determine whether to access the network based on parameters broadcast in the UAC. Broadcast signaling of the UAC includes some restriction information sets (BarringInfo set). A quantity of the restriction information sets may be 2, 4, 8, or the like. The restriction information sets may be applicable to all PLMNs, or may be separately configured for each PLMN. Information configured in a restriction information set includes at least a restriction probability, barring duration, and an AI. The restriction probability is a threshold for determining whether a UE can access to the network, the barring duration is used to calculate duration in which the access is barred, and the AI is a bitmap used to indicate whether access corresponding to some specific AIs is barred. The restriction information set may be represented by using an identifier of the restriction information set. There is a correspondence between an AC and a restriction information set. For example, for the 64 ACs, there is a restriction information set corresponding to each AC. Assuming that there are a total of eight restriction information resource sets (whose identifiers are 0, 1, 2 . . . 7), the restriction information resource sets may be configured in the following example in configuration information on the network side:

> AC 0: set 0
> AC 1: set 0
> AC 2 set 3
> AC 3 set 5
> AC 4 set 4
> ...

Assuming that a specific configuration value of the set 3 is as follows:

> BarringInfo set 3{
> Probability = 0.8
> Time = 6s
> AI = 1100000
> }

AC 2: set 3 indicates that a restriction information set corresponding to the AC whose identifier is 2 is the restriction information set whose identifier is 3. An association relationship between the AC and the restriction information set is configured on the network side. This indicates that a UE corresponding to an AC (for example, the AC 2) corresponding to the set 3 determines, based on the configuration of the set 3, whether an access attempt is barred. For example, the UE maps an access attempt of the UE to AC=2, and maps a UE configuration to AI=2. As shown in the foregoing example diagram, the AI bitmap is "AI=1100000". Because the AI bitmap indicates that a bit (bit) corresponding to AI=2 is 1, the access attempt of the UE is not barred, and the UE can directly initiate the access attempt. For another example, the UE maps an access attempt of the UE to AC=2, and maps a UE configuration to AI=4. The UE still determines, based on the set 3, whether the access attempt of the UE is barred. The UE generates a random value. When the random value is greater than probability=0.8, the access of the UE is barred. When the random value is less than or equal to 0.8, the access of the UE is not barred. In the foregoing example diagram, the probability field indicates the restriction probability, and the time field indicates the duration in which the access is barred.

UAC restriction information sets may alternatively be configured in the following manner: The UAC restriction information sets are configured as one common restriction information set (common BarringInfo set) and N (a value of N may be 2, 4, or 8) different restriction information sets (different BarringInfo set). A restriction information set (regardless of the common Barring Info set or the different BarringInfo set) includes a restriction probability, barring duration, and a corresponding AI (usually configured as a bitmap bitmap used to indicate which AIs are barred). An AC corresponds to a restriction information set (Barring Info). The restriction information set may be the common restriction information set or the different restriction information set. The common restriction information set is applicable to one or more ACs, and one restriction information set can be used by a plurality of ACs. This is a reason why the common restriction information set is introduced, and indicates that access control of the one or more ACs is restricted by the common restriction information set. For example, the ACs 1, 2, and 3 use a common restriction information set, and the common restriction information set includes at least the following parameters: a restriction probability (probability), barring duration (time), and an AI. When initiating access, a UE corresponding to the AC 1 determines, based on the parameters configured in the common restriction information set, whether an access attempt corresponding to the access is barred. Similarly, UEs corresponding to the AC 2 and the AC 3 also determine, based on the common restriction information set, whether access is barred. Usually, configuration content of the different restriction information set and the common restriction information set is different, and the one or more ACs may also use one different restriction information set. ACs that correspond to different restriction information sets are configured on the network side. For example, two different restriction information sets are configured on the network side, the AC 4 and the AC 5 are configured to correspond to the first different restriction information set, and the AC 6 and the AC 7 are configured to correspond to the second different restriction information set. This indicates that UEs corresponding to the AC 4 and the AC 5 determine, based on the first different restriction information set, whether access is barred, and that UEs corresponding to the AC 6 and the AC 7 determine, based on the second restriction information set, whether access is barred.

The common restriction information set and the different restriction information set may also be distinguished based on a set identifier (set index) of an access control parameter group, and may also be distinguished based on a configuration format. For example, a set whose set index is 0 is a common BarringInfo set (common restriction information set), and another set index represents a different BarringInfo set (different restriction information set). Alternatively, a common BarringInfo set (common restriction information set) is configured as the first set, and different BarringInfo sets (different restriction information set) are configured as the second set, the third set, and the like.

There is another possibility that the common restriction information set and the different restriction information set are not distinguished, and both are restriction information sets. Each restriction information set may be used by the one or more ACs.

An advantage of configuring the different restriction information sets and the common restriction information set that are different from each other is that the common restriction information set allows to be used by the plurality of ACs, thereby saving configuration signaling, and the different restriction information sets are used to increase a configuration diversity.

In all the following embodiments of the present disclosure, either of the foregoing two configuration methods may be used as a UAC-related configuration method.

4. CE-Level

One CE-level corresponds to a corresponding quantity of times of sending a signal, and each CE-level corresponds to a different quantity of times of repeated sending. A terminal with a lower CE-level has a smaller quantity of repetitions, and a terminal with a higher CE-level has a larger quantity of repetitions.

In terms of the UAC, all UEs determine whether to access the network based on the parameters broadcast in the UAC. However, when different UEs access a mobile communications system, sizes of resources used by the UEs are different. This is because a UE with a small quantity of repetitions occupies a relatively small quantity of resources, and a UE with a large quantity of repetitions occupies a relatively large quantity of resources. Currently, four CE-levels are supported in total. When a UE accesses a network, a pilot (preamble) sent by the UE corresponds to a CE-level. To be specific, there are four groups of preambles, a CE-level of the UE can be determined on the network side based on the preamble sent by the UE. Further, interaction signaling between the network side and the UE is of a same quantity of repetitions. Increasing a quantity of repetitions helps expand coverage, especially uplink coverage. However, more resources are also occupied. For example, a UE A is in CE-level 1, and a corresponding quantity of repetitions is assumed to be 4. A UE B is in CE-level 2, and a corresponding quantity of repetitions is assumed to be 8. In this case, the UE A needs to repeatedly send a pilot for four times, and the UE B needs to repeatedly send a pilot for eight times. The lengths of the pilots are the same, and a large quantity of repetitions definitely corresponds to a large quantity of occupied resources.

The CE-level corresponds to a measurement result (for example, a reference signal received power (reference signal receiving power, RSRP)), the quantity of repetitions, an amount of used resources, and the like. For example, there are three RSRP thresholds (namely, RSRP measurement result thresholds): RSRP 1, RSRP 2, and RSRP 3, and the four CE-level levels may be determined based on the three RSRP thresholds. A CE-level of a UE whose RSRP measurement result is greater than or equal to the RSRP 3 is 0. A CE-level of a UE whose RSRP measurement result is greater than or equal to the RSRP 2, and less than or equal to the RSRP 3 is 1. A CE-level of a UE whose RSRP measurement result is greater than or equal to the RSRP 1, and less than or equal to the RSRP 2 is 2. A CE-level of a UE whose RSRP measurement result is less than or equal to the RSRP 1 is 3. The CE-level corresponds to the quantity of repetitions. For example, a quantity that is of repetitions and that corresponds to the CE-level 0 is 0, a quantity that is of repetitions and that corresponds to the CE-level 1 is 4, a quantity that is of repetitions and that corresponds to the CE-level 2 is 8, and a quantity that is of repetitions and that corresponds to the CE-level 3 is 16. Therefore, the CE-level can be equivalently replaced with the RSRP. In all the following embodiments of the present disclosure, a professional term "CE-level" used for solution description may also be equivalently replaced with a related value of the RSRP, a related value of the quantity of repetitions, a related value of the amount of used resources, or the like.

In the embodiments of this application, to implement more effective congestion control on the network side of the UAC, resource usage of a UE is considered. The 5G system may control a quantity of accessed UEs with different resource consumption quantities based on the resource consumption quantities of the UEs. To enable more UEs to access the network, a UE with a relatively small resource consumption amount is usually more likely to be allowed to access the network, thereby reducing an access probability of a UE with a large resource consumption amount.

There are mainly the following three solutions in the embodiments of this application:

1. In the UAC, the CE-level is considered, so that parameters can be separately configured in access control based on an amount of used resources to implement more effective congestion control.

2. A transmit power is one of factors of AC mapping, or one of factors of a differentiated parameter configuration of the UAC, so that UEs with different transmit power levels can be controlled based on the UAC to implement more effective congestion control.

3. A CE-level rollback access mechanism is designed, so that a UE may attempt to access the network by using another CE-level, and a restriction probability of some UEs (for example, UEs with a low transmit power) may be increased.

It should be noted that the embodiments of this application are mainly applied to the 5G system (which may also be referred to as an NR system) and an LTE/5GC system, and are particularly applicable to a 5G system with an internet of things (internet of thing, IoT) scenario.

FIG. 1 is a schematic diagram of an embodiment of an access control method according to an embodiment of this application. This embodiment of the access control method according to this embodiment of this application includes the following steps.

101. A UE determines, based on a first CE-level, a first UAC parameter corresponding to the first CE-level.

In this embodiment, the UE may first determine, based on the first CE-level, the first UAC parameter corresponding to the first CE-level. One UAC parameter is a UAC parameter corresponding to one CE-level. In other words, the first CE-level and a third CE-level each have one UAC parameter. Usually, a quantity of CE-levels is a constant. One UAC parameter may include a plurality of restriction information sets. For example, four restriction information sets form one UAC parameter. The UAC parameter has a corresponding CE-level. In Example 1 below, it can be learned from "SEQUENCE(SIZE (1 . . . maxBarringInfoSet))" in "UAC-BarringInfoSetList" in the first line that, if SIZE is 4, it indicates that UAC-BarringInfoSetList is a list with a length of 4; in other words, there are four restriction information sets in the UAC parameter. In Example 1, "uac-BarringFactor", "uac-BarringTime", and "uac-BarringForAccessIdentity" indicate parameters in UAC, for example, a restriction probability, barring duration, and indication information about an AI respectively. One UAC parameter may further include a correspondence between an AC and a restriction information set, may indicate a correspondence from the AC to the restriction information set, and may also indicate a correspondence from the restriction information set to the AC. An identifier of the restriction information set may be represented by using an integer value, or may be represented by using a bitmap, or may be indicated according to another method. An identifier of the AC may be represented by using an integer value, or may be represented by using a bitmap, or may be indicated according to another method.

Example 1

```
        UAC-BarringInfoSetList    SEQUENCE (SIZE (1 ...
maxBarringInfoSet)) OF UAC-BarringInfoSet OPTIONAL,
    -- FFS: maxBarringInfoSet = at most 8
    UAC-BarringInfoSet ::= SEQUENCE {
        uac-BarringInfo      SEQUENCE {
            uac-BarringFactor      ENUMERATED {
                    p00, p05, p10, p15, p20, p25, p30, p40,
                    p50, p60, p70, p75, p80, p85, p90, p95},
    -- FFS: How many factors should be supported? As in LTE vs. {p00, p30, p60, p90}
            uac-BarringTime        ENUMERATED {s4, s8, s16, s32, s64, s128,
s256, s512},
            uac-BarringForAccessIdentity    BIT STRING (SIZE(7))
        }
```

Chinese translation of English parameters involved in Example 1 is as follows:

UAC-BarringInfoSetList: UAC-BarringInfoSetList is a restriction information set list configured with the UAC parameter.

maxBarringInfoSet: maxBarringInfoSet is a maximum quantity of restriction information sets.

UAC-BarringInfoSet: UAC-BarringInfoSet is a restriction information set configured with the UAC parameter.

uac-BarringInfo: uac-BarringInfo is restriction information configured with the UAC parameter.

uac-BarringFactor: uac-BarringFactor is the restriction probability in the UAC.

uac-BarringTime: uac-BarringTime is the barring duration in the UAC.

uac-BarringForAccessIdentity: uac-BarringForAccessIdentity is indication information in the UAC and indicating that the AI is restricted.

BIT STRING: BIT STRING is a bit string

One UAC parameter may alternatively include at least one of a plurality of different restriction information sets and one common restriction information set. For example, if one common restriction information set and eight different restriction information sets all correspond to CE-level 1, the nine sets are collectively referred to as one UAC parameter, and the UAC parameter is a parameter of the CE-level 1, and may be referred to as the first UAC parameter. For another example, if one common restriction information set and two different restriction information sets all correspond to CE-level 3, the three sets are collectively referred to as one UAC parameter, and the UAC parameter is a parameter of the CE-level 3, and may be referred to as a third UAC parameter.

A correspondence between a UAC and a CE-level may be sequential correspondence (referring to an example in Example 2 below). To be specific, the first UAC parameter corresponds to the CE-level 1, the second UAC parameter corresponds to CE-level 2, and so on. In Example 2, "uac-barringPerCElist" includes a plurality of "UAC-BarringPerCE". In other words, "uac-barringPerCElist" is a list of a plurality of "UAC-BarringPerCE"s. Each "UAC-BarringPerCE" represents a UAC parameter, and corresponds to a CE-level.

Example 2

```
UAC-BarringPerPLMN ::=              SEQUENCE {
    plmn-IdentityIndex                  INTEGER (1 ... maxPLMN),
    uac-barringPerCEList                UAC-BarringPerCEList
}
UAC-BarringPerCEList :: SEQUENCE (SIZE(1 ... maxCElevel)) of UAC-
BarringPerCE
    UAC-BarringPerCE :: = SEQUENCE {
        uac-BarringPerCatList       UAC-BarringPerCatList
    }
```

Chinese translation of English parameters involved in Example 2 is as follows:

UAC-BarringPerPLMN: UAC-BarringPerPLMN is a UAC barring configuration for each PLMN.

plmn-IdentityIndex: plmn-IdentityIndex is an identifier of a PLMN.

maxPLMN: maxPLMN is a maximum quantity of PLMNs.

uac-barringPerCEList: uac-barringPerCEList is a UAC restriction information configuration list configured based on CE-levels.

maxCElevel: maxCElevel is a maximum quantity of CE-levels.

UAC-BarringPerCE: UAC-BarringPerCE is UAC restriction information of each CE-level.

UAC-BarringPerCatList: UAC-BarringPerCatList is a UAC restriction parameter list configured based on ACs.

UAC-BarringPerPLMN herein refers to a UAC parameter configuration in a public land mobile network (PLMN), including a UAC-BarringPerCEList list, which includes a maximum of maxCElevel UAC-BarringPerPLMN-PerCEs. This indicates that in UAC-BarringPerPLMN, the UAC parameter is configured based on the CE-level. For example, if a length of the UAC-BarringPerPLMN list is 2, it indicates that two UAC parameters corresponding to two CE-levels are configured for the PLMN, and the first UAC-BarringPerCE indicates the UAC parameter corresponding to the first CE-level, and the second UAC-BarringPerCE indicates the UAC parameter corresponding to the second CE-level.

The UAC parameter corresponding to each CE-level includes a configuration of restriction information sets for the ACs. For example, a UAC parameter of a CE-level includes a configuration of a correspondence between 32 ACs and restriction information sets (BarringInfo set).

It should be noted that, as described above, a CE-level corresponds to a measurement result, a quantity of repetitions, and the like. Therefore, in this embodiment, the CE-level may be replaced with an RSRP-related parameter and a parameter related to the quantity of repetitions. For example, the UE determines the first UAC parameter based on a first RSRP measurement result of the UE. Alternatively, the UE determines the first UAC parameter based on a first quantity of repetitions of the UE. Whether the UE determines the first UAC parameter based on the first CE-level or the first RSRP is not specifically limited in this embodiment.

102. The UE determines a first AC based on the first CE-level and a type that is of an access attempt.

In this embodiment, the UE may determine the first AC based on the first CE-level and the type of the access attempt.

The AC determined by the UE based on a CE-level, and the type that is of the access attempt may be one or more of a standard AC (standardized AC), or an operator classified AC (operator classified AC). For example, referring to Table 3 below, a type related to the CE-level refers to one of types that are of access attempts and that corresponds to AC 8, 9, 10, and 11. When the type of the access attempt of the UE is CE-level=0, the UE may map the type of the access attempt to AC=8. If the access attempt complies with a plurality of access types (except for emergency calls) and an access type related to the CE-level has a higher priority, the access type is preferentially mapped to the AC corresponding to the CE-level. For example, if the access attempt matches both category 1 and category 8, the access type is preferentially mapped to the AC corresponding to the category 8.

103. The UE maps a UE configuration to a first AI based on the first CE-level.

In this embodiment, the UE may further determine the first AI based on the first CE-level and the UE configuration (namely, a device type of the UE). As described above, AI 11-15 in Table 4 below are configurable by operators. AI 1 and AI 2 respectively indicate that the UE device supports a multimedia service and a critical service. For example, the UE that supports the multimedia service may map a device type of the UE to AI 1.

The UE determines an AI based on the CE-level and the UE configuration. The AI may be a reserved AI (reserved AI, which is reserved for future protocol extension), or may be a UE configured AI (AI configured for the UE, which is a defined AI, is configured on a network side for the UE, and is equivalent to an AI defined by an operator). For example, referring to Table 4 below, AI 11-15 are values configured on the network side for the UE, and the AIs may further correspond to different CE-levels. In this way, the CE-level corresponds to a specific AI. During UAC determining, the UE determines whether to initiate an access attempt based on a value of the AI. In this way, the CE-level is considered in the UAC.

TABLE 4

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. UE is in CE-level 0. |
| 12 (NOTE 3) | Access Class 12 is configured in the UE. UE is in CE-level 1. |

TABLE 3

| Access Category number | Conditions related to UE | Type of access attempt |
|---|---|---|
| 0 | All | MO signaling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signaling resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that does not belong to any other Access Categories |
| 8 | For the conditions in Access Category 1. | UE is in CE-level 0 |
| 9 | For the conditions in Access Category 1. | UE is in CE-level 1 |
| 10 | For the conditions in Access Category 1. | UE is in CE-level 2 |
| 11 | For the conditions in Access Category 1. | UE is in CE-level 3 |
| 12-31 | | Reserved standardized Access Categories |
| 32-63 (NOTE 2) | All | Based on operator classification |

TABLE 4-continued

| Access Identity number | UE configuration |
|---|---|
| 13 (NOTE 3) | Access Class 13 is configured in the UE. UE is in CE-level 2. |
| 14 (NOTE 3) | Access Class 14 is configured in the UE. UE is in CE-level 3. |
| 15 (NOTE 3) | Access Class 15 is configured in the UE. |

104. The UE determines, based on the first UAC parameter, the first AC, and the first AI, whether access of the UE is barred.

After determining the first UAC parameter, the first AC, and the first AI, the UE may determine, based on the first UAC parameter, the first AC, and the first AI, whether the access of the UE is barred.

Specifically, UAC parameters for different scenarios are configured in broadcast information of a 5G system. The UE maps an access attempt that is about to be initiated to a corresponding access category, maps the UE configuration to a corresponding access identifier, and determines, based on the first UAC parameter that is configured in the broadcast information and that corresponds to the first CE-level, whether the access of the UE is barred.

The determining, by the UE, whether the access attempt is barred means that the UE cannot initiate an access attempt. An example of a case in which the access attempt is barred is as follows: 1) The UE may determine, based on an access category bitmap (access class bitmap) configured in the broadcast signaling, whether the access of the UE is barred. 2) Alternatively, the UE determines, by comparing a random number generated by the UE with a probability value in the broadcast, whether the access attempt can be initiated. If the access attempt is barred, the UE does not initiate an access attempt in corresponding barring duration.

For example, if determining that the CE-level of the UE is 1, the UE maps the access attempt of the UE to a corresponding AC value, and maps the UE configuration to a corresponding AI value. The UE determines, based on the CE-level 1, a UAC configuration corresponding to the CE-level 1. If AC=2, and AI=5, the UAC configuration corresponding to the CE-level 1 is the second configuration in UAC-BarringPerCEList.

The UAC-BarringPerCEList is a list of UAC parameters corresponding to a plurality of CE-levels. The UAC parameters corresponding to the plurality of CE-levels are configured based on a sequence of the CE-levels; to be specific, the first UAC-BarringPerCE in the UAC-BarringPerCEList is configured based on CE-level 0, the second UAC-BarringPerCE is configured based on the CE-level 1, and so on. The UAC configuration corresponding to the CE-level 1 includes restriction information sets corresponding to a plurality of ACs. (To be specific, UAC-BarringPerCE includes UAC-BarringPerCatList, and indicates access restriction parameters configured for a plurality of ACs at a CE-level, where UAC-BarringPerCatList is a list of a plurality of UAC-BarringPerCats, and indicates access parameters configured for the plurality of ACs.)

In this case, the UE determines which restriction information set corresponds to AC=2 in the CE-level 1, and then determines, based on a restriction probability value or an AI bitmap configuration in the restriction information set, whether the access of the UE is barred. AI=5 is not restricted by an AI configuration. Therefore, the UE generates a random number, and determines, based on a relationship between the random number and a threshold, whether the access attempt of the UE is barred. Alternatively, the UE may not use a random number to determine whether the access attempt of the UE is barred. For example, if the AI corresponding to the UE is an AI (for example, AI=2) indicated by the AI bitmap, the UE may directly determine, based on 1 or 0 in the bitmap instead of the random number, whether the access attempt is not barred or is barred.

In addition, for ease of understanding, reference is made to the description of the third point related to the UAC, and the first example of the restriction information set in the part of the specific embodiment above, and details are not described herein again.

In this embodiment, parameters can be separately configured in access control based on an amount of used resources to implement more effective congestion control. For example, a UE in the CE-level 1 has a quantity of repetitions of 4, and a UE in the CE-level 2 has a quantity of repetitions of 8. When congestion occurs on the network side, if the UE that is in the CE-level 2 accesses the network side, consumed resources are equivalent to resources consumed if several UEs that are in the CE-level 1 access the network side. Consequently, a quantity of UEs that access a network decreases sharply. Which UEs access the network side is determined on the network side. A bar (bar) probability (namely, the foregoing restriction probability) of the CE-level 2 may be set to a smaller value on the network side. In this way, a quantity of UEs that can access the network side increases. UEs are distinguished based on a resource amount, and access of UEs with a large resource consumption amount can be controlled restrictedly, thereby increasing a quantity of UEs that are allowed to access the network.

It should be noted that there is no absolute sequence between step 101 to step 103 in this embodiment. Step 102 may be performed first, and then steps 101 and 103 are performed. Alternatively, step 103 may be performed first, and then step 103 and step 101 are performed. This is not specifically limited herein.

In addition, the UE may alternatively determine, based only on the first UAC parameter, whether the access of the UE is barred, or the UE may determine, based on the first UAC parameter and the first AC, whether the access of the UE is barred, or the UE may determine, based on the first UAC parameter and the first AI, whether the access of the UE is barred. This is not specifically limited herein.

The following gives an example in which the UE may determine, based on the first UAC parameter and the first AC, whether the access of the UE is barred. The UE determines the corresponding AC value based on the access attempt. The AI value is a default value, and the default value may be a value stored on a UE side based on a capability of the UE. For example, the UE is a UE supporting a voice conversation. Assuming that the voice conversation is a service customized by an operator, when the UE registers with the network, the UE may store a default AI=15. Therefore, when determining whether the access attempt is barred, the UE only needs to obtain the AC value through mapping, and does not need to obtain the AI value through mapping. In addition, a UAC parameter configured on a network side is used, and the UE can determine whether the access of the UE is barred.

Alternatively, the UE may determine, based on the first UAC parameter and the first AI, whether the access of the UE is barred. Similar to the foregoing example, the AC value is changed to a default value, and the default AC value may be stored on the UE side.

In this embodiment of this application, the UE may determine, based on the first AC, the first AI, and the UAC parameter that corresponds to the first CE-level and that is determined based on the first CE-level, whether the access of the UE is barred. Because the first UAC is determined based on the first CE-level, a network system may control the access of the UE based on the CE-level of the UE. A high CE-level indicates a large quantity of access repetitions in the CE-level, and a large quantity of resources to be used. If such a UE accesses the network, more other UEs cannot access the network. Therefore, UE with a high CE-level may be barred from accessing the network, so that more UEs can access the network. In this way, UAC parameters may be separately configured for UEs based on a resource usage amount in access control, to implement the more effective congestion control.

Figure 2:
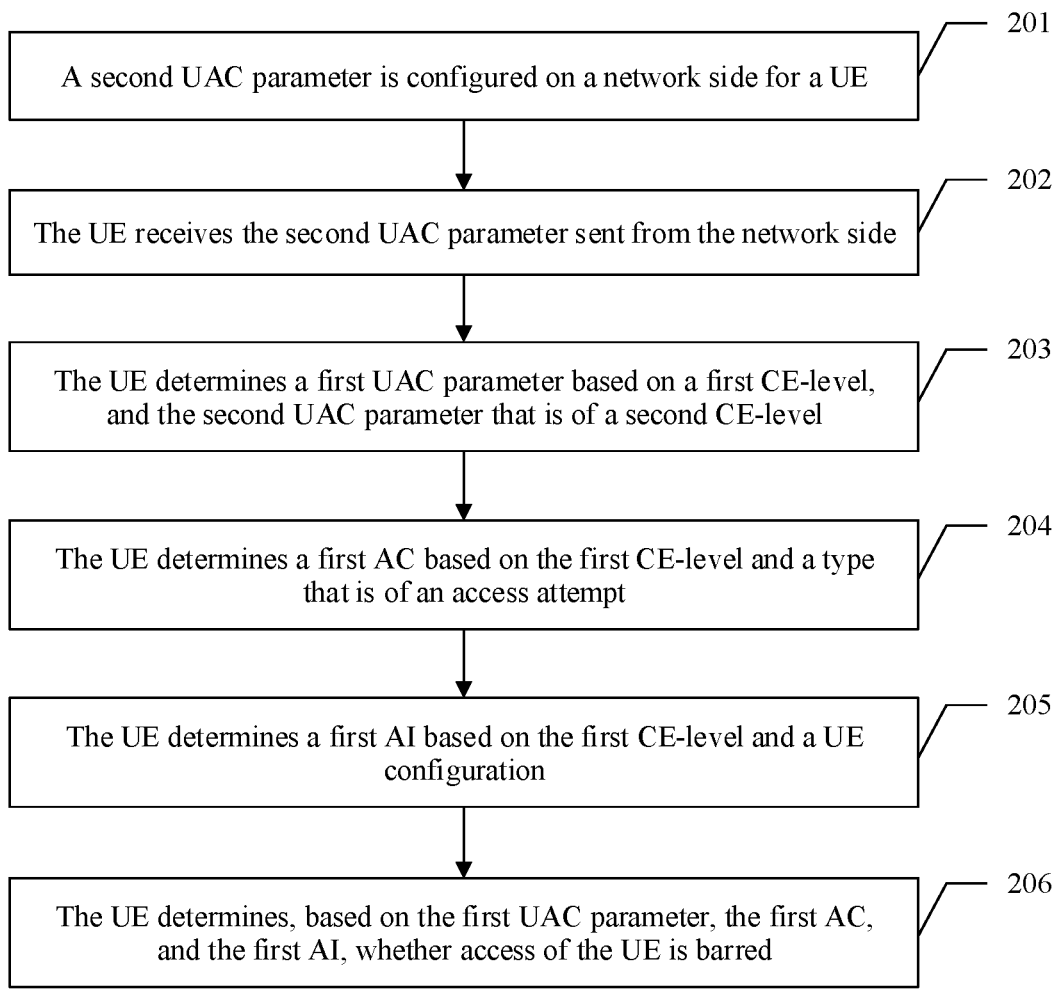
FIG. 2 is a schematic diagram of another embodiment of an access control method according to an embodiment of this application.

The foregoing describes the embodiment of the access control method, and the following describes another embodiment of an access control method. Referring to FIG. 2, the another embodiment of the following control method includes the following steps.

201. A base station configures a third UAC parameter for a UE.

In this embodiment, the base station may configure the third UAC parameter for the UE based on a third CE-level.

In this embodiment, an example in which the base station is a network side is used for description. In this embodiment, a small cell, a macro site, a micro site, or a core network device may also be used as a network side. This is not specifically limited herein.

It should be noted that, when configuring a UAC parameter, the base station may configure, in the UAC configuration, CE-level indication (CE-level indication) information used to indicate a CE-level. Each CE-level has at least one restriction information set. A value of the CE-level may be indicated in the UAC parameter configured based on the CE-level, for example, referring to Example 3 below.

Example 3

```
UAC-BarringPerCE :: = SEQUENCE {
    ce-levelIndication       INTEGER (0 ... 3),
    uac-BarringPerCatList    UAC-BarringPerCatList
}
```

In Example 3, CE-level indication information "ce-levelIndication" is configured in CE-level restriction information (as BarringPerCE above).

Chinese translation of English parameters involved in Example 3 is as follows:

UAC-BarringPerCE: UAC-BarringPerCE is UAC restriction information of each CE-level.

ce-levelIndication: ce-levelIndication is the CE-level indication information

UAC-BarringPerCatList: UAC-BarringPerCatList is a UAC restriction parameter list configured based on ACs.

In addition, the value of CE-level may alternatively be indicated in the restriction information set, for example, referring to Example 4 below.

Example 4

```
UAC-BarringInfoSet ::= SEQUENCE {
    CE-levelIndication    INTEGER (0 ... 3)
    uac-BarringInfo       SEQUENCE {
        uac-BarringFactor        ENUMERATED {
                                     p00, p05, p10, p15, p20, p25, p30, p40,
                                     p50, p60, p70, p75, p80, p85, p90, p95},
        uac-BarringTime          ENUMERATED {s4, s8, s16, s32, s64, s128,
s256, s512},
        uac-BarringForAccessIdentity    BIT STRING (SIZE(7))
    -- maxAccessIdentity = 7
    -- bit 0 in the bit string corresponds to AI 1, bit 1 to AI 2, bit 2 to AI 11, bit 3 to AI
12 and so on
    -- Value 0 indicates that access attempt is allowed for the corresponding access
identity
    }
```

In the foregoing Example 4, CE-level indication information "CE-levelIndication" is configured in "UAC-BarringInfoSet::=SEQUENCE" that indicates the restriction information set.

Chinese translation of English parameters involved in Example 4 is as follows:

UAC-BarringInfoSet: UAC-BarringInfoSet is a restriction information set configured with the UAC parameter.

ce-levelIndication: ce-levelIndication is the CE-level indication information uac-BarringInfo: uac-BarringInfo is restriction information configured with the UAC parameter.

uac-BarringFactor: uac-BarringFactor is a restriction probability in UAC.

uac-BarringTime: uac-BarringTime is barring duration in the UAC.

uac-BarringForAccessIdentity: uac-BarringForAccessIdentity is indication information in the UAC and indicating that an AI is restricted.

maxAccessIdentity: maxAccessIdentity is indication information of a maximum AI

Alternatively, each CE-level has at least one common restriction information set and one different restriction information set. But there are two possible cases.

Possible Case 1:

A CE-level does not have a corresponding configuration, to be specific, does not have the common restriction information set nor the different restriction information set. That is, the CE-level may correspond to a UAC parameter that is not configured. In a case in which a broadcast message does not include the UAC parameter corresponding to the CE-level:

(1) The UE may directly access a 5G system without being restricted by access control. For example, CE-level 0, CE-level 1, and CE-level 2 each have a common restriction information set and a different restriction information set, and CE-level 3 does not have a corresponding configuration, which indicates that the CE-level 3 is not restricted by the access control; in other words, the UE may directly access a network based on the CE-level 3.

(2) The UE may use a default configuration. The default configuration may be a common restriction information set of the PLMN (which may be referred to as PLMN-common in English). For example, if the configuration of the CE-level 3 is a PLMN-common configuration, and the PLMN-common configuration includes a configuration of restriction information sets for ACs, a UE in the CE-level 3 determines, based on a common restriction information set or a different restriction information set, whether access can be initiated.

Example 5

```
UAC-BarringPerPLMN ::=        SEQUENCE {
    plmn-IdentityIndex            INTEGER (1 ... maxPLMN),
    uac-barringPerCEList          UAC-BarringPerCEList
}
UAC-BarringPerCEList :: SEQUENCE (SIZE(1 ... maxCElevel)) of UAC-BarringPerCE
    UAC-BarringPerCE :: = SEQUENCE {
        ce-levelIndication          INTEGER (0 ... 3),
        uac-BarringPerCatList       UAC-BarringPerCatList
}
```

In Example 5, the field "ce-levelIndication INTEGER (0 . . . 3)" is used to indicate CE-levels. In the "ce-levelIndication INTEGER (0 . . . 3)", a value ranges from 0 to 3 indicates corresponding CE-levels. The value 0 indicates CE-level 0, the value 1 indicates CE-level 1, and so on.

Chinese translation of English parameters involved in Example 5 is as follows:

UAC-BarringInfoSet: UAC-BarringInfoSet is a restriction information set configured with the UAC parameter.

ce-levelIndication: ce-levelIndication is the CE-level indication information uac-BarringInfo: uac-BarringInfo is restriction information configured with the UAC parameter.

uac-BarringFactor: uac-BarringFactor is a restriction probability in UAC.

uac-BarringTime: uac-BarringTime is barring duration in the UAC.

uac-BarringForAccessIdentity: uac-BarringForAccessIdentity is indication information in the UAC and indicating that an AI is restricted.

BIT STRING: BIT STRING is a bit string

CE-level indication may alternatively be configured in a resource restriction set. For a similar example, refer to Example 4 above.

Possible Case 2:

A UAC configuration corresponding to a CE-level has only a common restriction information set or only a different restriction information set. For example, referring to Example 6 below, parameters of a common restriction information set of CE-level 0 and parameters of a different restriction information set of CE-level 1 are broadcast in broadcast signaling. In this way, for the CE-level 0, because the parameters of the different restriction information set are not configured, it may be considered that the CE-level 0 is restricted only by the common restriction information set, and similarly, the CE-level 1 is restricted only by the different restriction information set.

Example 6

```
UAC-perCat-Common
{
    CE-level indication : 00
    probability
    Time
    AI
}
UAC-perCat-Different
{
    CE-level indication : 01
    probability
```

-continued

```
    Time
    AI
}
```

202. The UE receives the third UAC parameter sent by the base station.

The base station enables the broadcast information to carry the third UAC parameter for broadcasting, and the UE may receive the third UAC parameter sent by the base station. The third UAC parameter is a full set of complete configured parameters, including the restriction probability (probability), the barring duration (time), and configuration information of the AI.

203. The UE determines a first UAC parameter based on a first CE-level and the third UAC parameter that is of the third CE-level.

When values of parameters in the first UAC parameter corresponding to the first CE-level are incomplete, and the UE needs to determine whether the UE can access a communications network of the 5G system based on the first UAC parameter, after obtaining the third UAC parameter, the UE may determine, based on the first CE-level and the third UAC parameter that corresponds to the third CE-level, the first UAC parameter corresponding to the first CE-level. Because values of parameters in the third UAC parameter are complete, the values of the parameters in the first UAC parameter may be determined according to the following two methods.

Method 1: The UE determines the first UAC parameter based on the third UAC parameter of the third CE-level, the first CE-level, and a differential value between the third UAC parameter and the first UAC parameter. Reference is made to Example 5. Fields in Example 5 are set to differential values. The UE may add the values of the parameters in the third UAC parameter to the configured differential values, to obtain the values of the parameters in the first UAC parameter.

Reference is made to values configured in the following signaling. Values configured in a UAC parameter group of a reference CE-level are actual values, and values configured in a UAC parameter of another CE-level are differential values relative to the UAC parameter of the reference CE-level. For example, a configured value of uac-BarringInfo of the reference CE-level is as follows:

```
Uac-BarringInfo
{
    Uac-BarringFactor = p20
    Uac-BarringTime = s4
    Uac-BarringForAccessIdentity = 1100000
}
```

A configured value of uac-BarringInfo of the another CE-level (for example, the reference CE-level is CE-level 0, and the another CE-level is CE-level 1) is a differential value relative to the reference CE-level. For example:

```
Uac-BarringInfo
{
    Uac-BarringFactor = p30
    Uac-BarringTime = s8
    Uac-BarringForAccessIdentity = 0010000
}
```

An actual configured value of uac-BarringInfo of the CE-level 1 is as follows:

```
Uac-BarringInfo
{
    Uac-BarringFactor = p50
    Uac-BarringTime = s12
    Uac-BarringForAccessIdentity = 1110000
}
```

Only one of the differential value and the actual value can be used for configuration. An advantage of using the differential value for configuration is that a value range can be properly narrowed to save signaling. For example, a value range of the restriction probability is p00, p05, p10, p15, p20, p25, p30, p40, p50, p60, p70, p75, p80, p85, p90, p95, and 4 bits are required. According to differentiation, the value range may be set to p−80, p−60, p−40, p−20, p0, p20, p4, p60, and 3 bits are required. An offset value is added on the basis of a reference configuration (although the signaling is saved, the value range may also be limited because compared with the indicated actual values, a range from 0% to 100% is not completely covered). It should be noted that if a reference restriction probability to which a deviation value is added is smaller than 0, it indicates that the probability is 0, which is equivalent to being completely barred; if the reference limit probability to which a deviation value is added is greater than 1, it indicates that the probability is 1, which is equivalent to being completely allowed. A differential configuration may also be applied to the field Time. To be specific, a barring duration field in a UAC parameter configuration is set to a difference between the barring duration in the UAC parameter configuration and barring duration in a reference UAC parameter configuration. For example, if the reference barring duration is 2 ms, and actual barring duration of the UAC is 6 ms, the UAC barring duration field is set to a difference of 4 ms. An AI bitmap (bitmap) field may also use a differential configuration similar to the principle. For example, if an AI bitmap in a reference UAC is 1100000, and an actual AI in a UAC is 1000000, a difference (binary difference) between the two is 0100000. Therefore, the AI field of the UAC is set to the difference 0100000.

The differential configuration may be applied only to the Uac-BarringFactor field and the Uac-BarringTime field, and not applied to the Uac-BarringForAccessIdentity field; to be specific, the Uac-BarringForAccessIdentity field is set to an actual value of the another CE-level, which means that actual Uac-BarringForAccessIdentity of the CE-level 1 is 010000 in the foregoing example.

The differential configuration may also be considered as another numerical configuration method, and a value range may also be ensured without saving signaling. For example, for the restriction probability, 4 bits are still used.

Method 2: The UE determines the first UAC parameter based on the third UAC parameter of the third CE-level, the first CE-level, and a scale factor.

In the method, CE-level based UAC is configured based on the scale factor, so that signaling overheads can be saved. For example, in Example 7 below, a configuration of the reference CE-level (the CE-level 0) is UAC-BarringPerCatList, and scale factors of the another CE-level relative to the reference CE-level are configured in UAC-CoeffPerCEList. For example, in UAC-CoeffPerCEList={0.4, 0.8, 0.2}, three scale factors correspond to CE-level 1, 2, and 3, respectively. Then, uac-BarringFactor of the CE-level 1=uac-BarringFactor of the CE-level 0×0.4, and uac-BarringTime of the CE-level 1=uac-BarringTime of the CE-level 0×0.4; uac-BarringFactor of the CE-level2=uac-BarringFactor of the CE-level 0×0.8, and uac-BarringTime of the CE-level2=uac-BarringTime of the CE-level 0×0.8; uac-BarringFactor of the CE-level 3=uac-BarringFactor of the CE-level 0×0.2, and uac-BarringTime of the CE-level 3=uac-BarringTime of the CE-level 0×0.2.

Example 7

```
UAC-BarringPerPLMN ::=         SEQUENCE {
    plmn-IdentityIndex             INTEGER (1 ... maxPLMN),
    uac-BarringPerCatList          UAC-BarringPerCatList
    uac-CoeffPerCEList             UAC-CoeffPerCEList
}
UAC-CoeffPerCEList :: SEQUENCE (SIZE(1 ... maxCElevel-1)) of UAC-CoeffPerCE
    UAC-BarringPerCE :: = ENUMERATED {p00, p20, p40, p60, p80, p120, p160, p180}
```

In Example 6, "uac-CoeffPerCElist" represents a scale factor list.

The English words involved in Example 7 above are translated as follows (For repeated words, refer to the foregoing examples, and details are not described herein again):

uac-CoeffPerCEList: uac-CoeffPerCEList is the scale factor list configured based on CE-levels.

UAC-CoeffPerCE: UAC-CoeffPerCE is the scale factor of each CE-level.

The scale factor may be configured in a broadcast manner. For example, the scale factor and a UAC parameter may be broadcast in a same SIB (such as a SIB 2), or may be broadcast in different SIBs. For example, in Example 7 above, a common parameter of the CE-level 2 is obtained by multiplying a common parameter of the CE-level 1 by the scale factor Coeff-CE-level 2. In this case, a probability field of a CE-level 2 common set is 0.8×0.8, and a Time field is 6×0.8, and a probability field of a CE-level 2 different set is 0.6×0.8, and a Time field is 5×0.8. The scale factor can be applied to both the probability field and the Time field. The AI bitmap is not configured by using the scale factor. To be specific, a configuration of the AI bitmap of the another CE-level is the same as that of the reference CE-level.

The scale factor may also be a value predefined in a protocol, for example, a value related to parameters such as a speed of the UE, a location of the UE, transmit power of the UE, and an antenna configuration of the UE. The UE determines the scale factor based on the value predefined in the protocol, and determines, based on a configuration parameter obtained by combining the parameter in the broadcast and the scale factor, whether an access attempt can be initiated.

For example, the UE is relatively static; to be specific, a moving speed of the UE is relatively low, and a scale factor alpha related to the moving speed may be predefined in the protocol. Assuming that alpha=UE speed/reference speed, the reference speed is 3 km/h, and the moving speed of the relatively static UE is considered as 300 m/h, alpha is 0.1. Assuming that a UAC (for example, probability=0.8, and Time=8) corresponding to the CE-level 0 is broadcast on the network side, a UAC corresponding to the CE-level 1 that corresponds to the UE is increased by (1+alpha=1.1) times (that is, probability=0.8×1.1, Time=8×1.1), and a UAC corresponding to the CE-level 2 and a UAC corresponding to the CE-level 3 are both increased by (1+alpha) times.

204. The UE determines a first AC based on the first CE-level and a type that is of an access attempt.

205. The UE determines a first AI based on the first CE-level and a UE configuration.

206. The UE determines, based on the first UAC parameter, the first AC, and the first AI, whether the access of the UE is barred.

For example, parameters configured for the UE include a reference UAC configuration UAC-BarringPerCatList and a set of scale factors UAC-CoeffPerCEList={0.2, 0.4, 0.8}.

Assuming that the reference UAC corresponds to the CE-level 0, a configuration parameter group includes the following configurations:

```
Uac-BarringInfoSet
{
Uac-BarringFactor = 0.2
Uac-BarringTime = 4
Uac-BarringForAccessIdentity = 1010000
}
```

A configuration of a configuration parameter group corresponding to the CE-level 1 is as follows:

```
Uac-BarringInfoSet
{
Uac-BarringFactor = 0.2 * 0.2 = 0.04
Uac-BarringTime = 4*0.2 = 0.8
Uac-BarringForAccessIdentity = 1010000
}
```

Step 204 to step 206 in this embodiment are similar to steps 202 to 204 in the foregoing embodiment, and details are not described herein again.

It should be noted that there is no absolute sequence between step 203 to step 205 in this embodiment. Step 204 may be performed first, and then steps 203 and 205 are performed. Alternatively, step 205 may be performed first, and then steps 204 and 203 are performed. This is not specifically limited herein.

In addition, in this embodiment, step 204 and step 205 are optional steps; to be specific, the UE may alternatively determine the first UAC parameter based only on the first CE-level and the third UAC parameter that corresponds to the third CE-level, or determine the first UAC parameter based on the third UAC parameter corresponding to the third CE-level, the first CE-level, and one of an AC and or an AI. This is not specifically limited herein.

In this embodiment, the UE determines, based on the first AC, the first AI, the first CE-level, and the third UAC parameter that is of the third CE-level, whether the access of the UE is barred. Therefore, when the UE cannot directly learn of the first UAC parameter corresponding to the first CE-level, the first UAC parameter may be determined based on the complete third UAC parameter configured for another CE-level, so that the UE may learn of a CE-level of the UE. The base station determines, based on the CE-level of the UE, whether to allow the UE to access the network. If the CE-level is high, the base station may save resources by reducing an access probability of the UE, so that more UEs can access the network. Further, in this embodiment, because a differential configuration method or a scale factor method is used, resources can be further saved.

Figure 3:
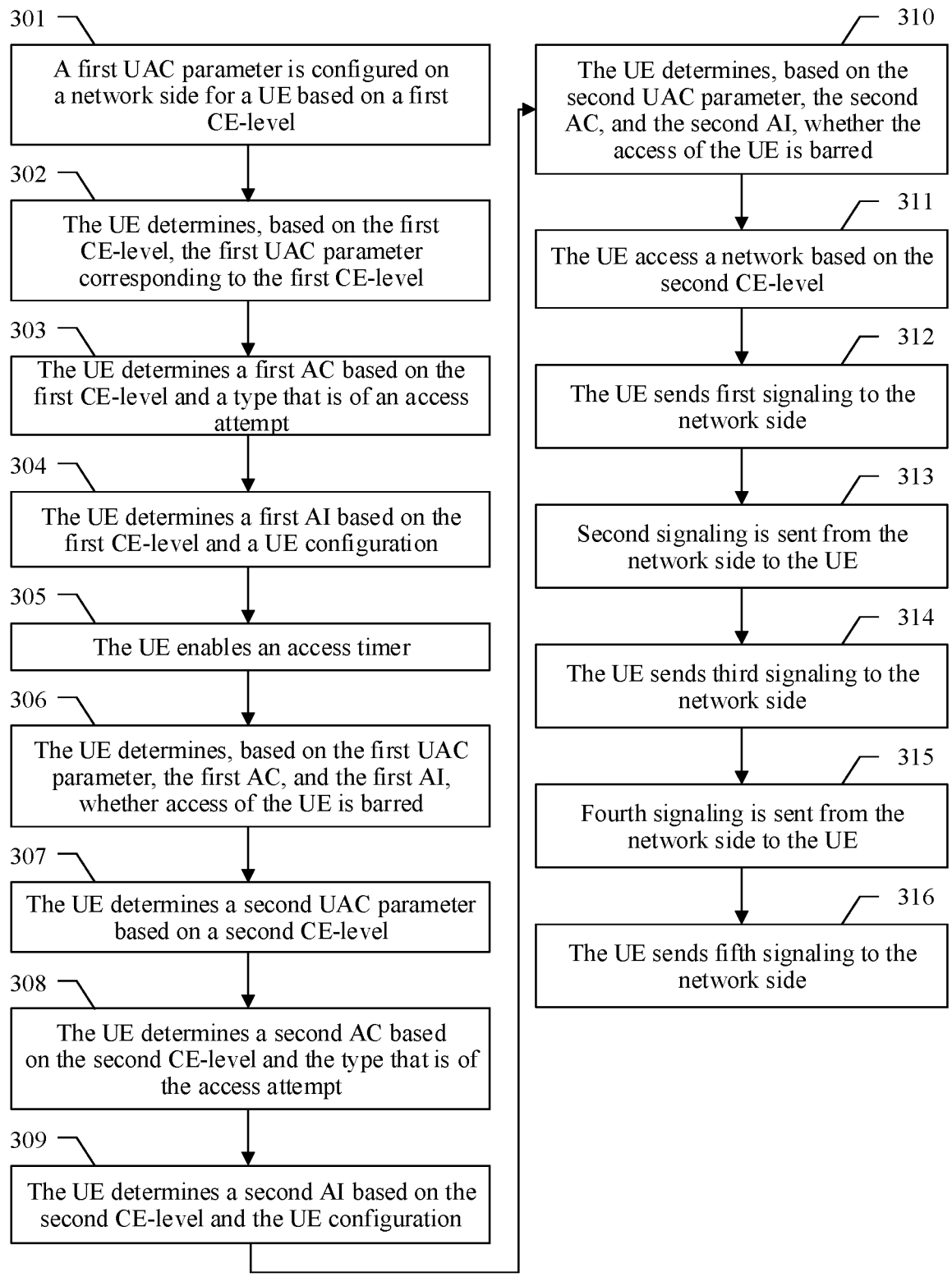
FIG. 3 is a schematic diagram of another embodiment of an access control method according to an embodiment of this application.
Figure 4:
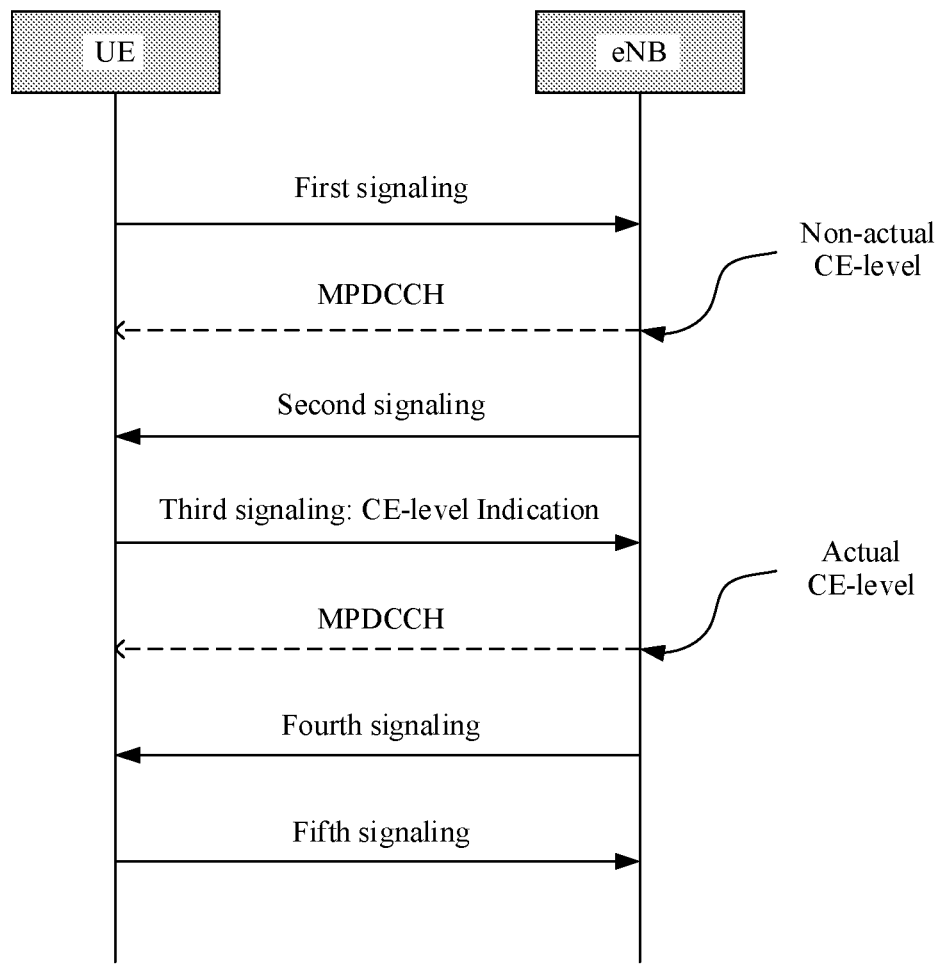
FIG. 4 is a signaling flowchart of an access control method according to an embodiment of this application.

The foregoing is an embodiment of an access control method, and the following is another embodiment of an access control method. FIG. 3 is a schematic diagram of another embodiment of an access control method, and FIG. 4 is a signaling flowchart of a CE-level rollback method according to this embodiment.

It should be noted that step 301 to step 303 in the following embodiment are similar to step 101 to step 103 and step 203 to step 205 in the foregoing embodiments, and step 307 and step 308 are similar to step 102 and step 103, and step 204 and step 205 in the foregoing embodiments. Details are not described herein again.

301. A first UAC parameter is configured on a network side for a UE based on a first CE-level.

302. A UE determines, based on the first CE-level, the first UAC parameter corresponding to the first CE-level.

303. The UE determines a first AC based on the first CE-level and a type that is of an access attempt.

304. The UE determines a first AI based on the first CE-level and a UE configuration.

305. The UE enables an access timer.

In this embodiment, step 305 and step 306 are simultaneously performed. To be specific, when determining, based on the first UAC parameter, whether access of the UE is barred, the UE enables the access timer.

The access timer may be used to determine, based on the first UAC parameter, whether the access of the UE is barred, or a counter may be used to determine, based on the first UAC parameter, whether the access of the UE is barred. Therefore, if the timer is enabled, whether the access of the UE is barred needs to be determined on preset duration of the timer. If the counter is enabled, whether the access of the UE is barred needs to be determined within a preset quantity of repetitions of the counter. A computational method of the counter is that a value of the counter is incremented by 1 each time an access attempt fails. A prerequisite for the timer to continue timing or the counter to continue counting is that the UE determines, based on the first UAC parameter, that the access of the UE is barred. If the UE determines, based on the first UAC parameter, that the access of the UE is not barred, the timer stops timing and is reset to an initial value, or the counter stops counting and is reset to an initial value.

306. The UE determines, based on the first UAC parameter, the first AC, and the first AI, whether the access of the UE is barred.

Within a preset threshold of the access timer; in other words, before the access timer expires, if the UE determines, based on the first UAC parameter, the first AC, and the first AI, that the access of the UE is not barred, the UE initiates an access attempt to a communications network (such as a base station), and the access control timer stops.

When duration of the access attempt initiated by the UE reaches the preset threshold of the access controller; that is, when the access timer expires, the UE may determine, based on the first UAC parameter, the first AC, and the first AI, that the access is barred. In this case, step 306 is performed.

307. The UE determines a second UAC parameter based on a second CE-level.

After the access timer reaches the preset threshold; in other words, after the access timer expires, the UE may select a UAC parameter corresponding to a higher CE-level, and determine again whether the access is allowed.

In this embodiment, after the access timer reaches the preset threshold (in other words, after the access timer expires), the UE may determine the second UAC parameter based on the second CE-level, where the second CE-level is higher than the first CE-level. Specifically, if the timer is used, after the duration of the access attempt initiated by the UE reaches the preset duration threshold of the timer, the UE may determine, based on the second UAC parameter determined based on the second CE-level, whether the access is barred. If the counter is used, after a quantity of times that the UE initiates an access attempt but fails to access the network reaches the preset quantity threshold of times of the counter, the UE may determine, based on the second UAC parameter determined based on the second CE-level, whether the access is barred.

It should be noted that the second UAC parameter may be determined based on the second CE-level, or may be obtained based on an indication. For example, the indication may be CE-level indication information. This is not specifically limited herein.

308. The UE determines a second AC based on the second CE-level, and the type that is of the access attempt.

309. The UE determines a second AI based on the second CE-level and the UE configuration.

310. The UE determines, based on the second UAC parameter, the second AC, and the second AI, whether the access of the UE is barred.

If the UE may determine, based on the second UAC parameter, the second AC, and the second AI, that the access of the UE is not barred, step 311 may be performed.

It should be noted that, steps 303 and 304 and steps 308 and 309 are optional steps. To be specific, the UE may alternatively determine, based only on the second UAC parameter (or the first UAC parameter), whether the access of the UE is barred, or the UE may alternatively determine, based on the second UAC parameter (or the first UAC parameter) and the second AC, whether the access of the UE is barred, or the UE may alternatively determine, based on the second UAC parameter (or the first UAC parameter) and the second AI (or the first AI), whether the access of the UE is barred.

311. The UE accesses the network based on the second CE-level.

If determining, based on the second UAC parameter, the second AC, and the second AI, that the access of the UE is not barred, the UE may access the communications network based on the second CE-level.

312. The UE sends first signaling to the network side.

In this embodiment, the UE determines, based on the second UAC parameter, the second AC, and the second AI, that the access of the UE is not barred, and the UE starts to perform step 312 to subsequent step 316. Step 312 to step 316 are also referred to as a random access procedure (random access channel, RACH procedure). In the RACH procedure, the UE and an evolved base station or NodeB (eNB) exchange signaling. In the exchanged signaling, a quantity of times of repeated sending also corresponds to a CE-level determined by the UE.

In other words, a quantity of repeatedly sending an Msg1 by the UE to the network side is a quantity that is of repetitions and that corresponds to the second CE-level.

Referring to the signaling flowchart in FIG. 4, the UE initiates the Message 1 to the network side based on the second UAC parameter.

The first signaling is the Message 1, which is usually abbreviated as the Msg1 and is the first signaling in the RACH procedure. The first signaling usually refers to an access pilot, is sent by the UE to the network, is not RRC signaling, and is only a pilot. There is a correspondence between a pilot (preamble) carried in the Msg1 and the CE-level of the UE. Therefore, the CE-level of the UE is determined on the network side by detecting the pilot sent by the UE. At a higher CE-level, the signaling exchanged between the UE and the network has a larger quantity of repetitions.

Message 2 (the second signaling in the RACH procedure, which may refer to a random access response, a random access response) may also be repeatedly sent for a quantity of times corresponding to the CE-level. Similarly, quantities of repetitions of a subsequent Message 3 (the third signaling, which may refer to a radio resource control connection request, radio resource command connection establishment request), signaling such as an MPDCCH (machine type communication physical downlink control channel (MTC physical Downlink Control Channel, MPDCCH)) used to demodulate a Message 4 (the fourth signaling, which may refer to a radio resource control connection, radio resource command connection setup) also correspond to the CE-level.

It should be noted that the RACH procedure herein is only an example. The exchanged signaling in the RACH procedure varies based on a UE status, a network configuration, and the like. For example, the third signaling (namely, the Message 3) may alternatively be a radio resource control connection resume request, radio resource command connection resume establishment request, and the fourth signaling (namely, the Message 4) may alternatively be a radio resource control connection resume, radio resource command connection resume command.

313. Second signaling (random access response, random access response) is sent from the network side to the UE.

After the first signaling sent by the UE is received on the network side, the random access response, namely, the second signaling is sent to the UE from the network side. A quantity of times of repeatedly sending the second signaling on the network side to the UE is the quantity that is of times and that corresponds to the second CE-level.

314. The UE sends the third signaling (radio resource control connection request, radio resource command connection establishment request) to the network side.

The third signaling carries first CE-level indication information used to indicate the first CE-level, and the UE notifies, based on the first CE-level indication information in the third signaling, the network side that an actual CE-level is the first CE-level. Whether the UE indicates CE-level indication (CE-level indication) information in the third signaling is optional. To be specific, if the UE indicates the CE-level indication information in the third signaling, it indicates that the UE accesses the network based on a new (namely, non-actual) CE-level (which refers to CE-level 3 in this embodiment). If the UE does not indicate the CE-level indication information in the third signaling, it indicates that the UE accesses the network based on the actual CE-level (which refers to the CE-level 1 in this embodiment).

315. The fourth signaling (radio resource control connection, radio resource command connection setup) is sent from the network side to the UE.

After receiving the connection establishment request, namely, the third signaling sent by the UE, the RRC connection setup, namely, the fourth signaling is sent from the network side to the UE. A quantity of repeatedly sending the fourth signaling from the network side is a quantity that is of repetitions and that corresponds to the first CE-level. As described above, the first CE-level is the actual CE-level.

Before the fourth signaling is sent, the MPDCCH used to demodulate the fourth signaling is first sent from the network side. After receiving the MPDCCH, the UE determines, based on an indication of the MPDCCH, a time-frequency resource used by the fourth signaling, and then receives the fourth signaling.

316. The UE sends fifth signaling (radio resource command connection acknowledgment, radio resource control connection complete) to the network side.

After receiving the Msg4 sent from the network side, the UE sends the RRC connection acknowledgment Msg5 to the network side. A quantity of repeatedly sending the Msg5 by the UE is also the quantity that is of repetitions and that corresponds to the first CE-level; in other words, the quantity of repeatedly sending the Msg5 by the UE is a quantity that is of repetitions and that corresponds to the actual CE-level.

In conclusion, in this embodiment, if the UE selects the new CE-level, and is successfully connected to the network side (such as the base station) based on a UAC parameter of the new CE-level. Then the Msg1 sent by the UE may carry a pilot corresponding to the new CE-level (namely, the non-actual CE-level, which is the second CE-level in this embodiment), and a quantity of repeatedly sending the first signaling is a quantity that is of repetitions and that corresponds to the new CE-level (the second CE-level). However, the new CE-level does not reflect an actual UE situation. Therefore, the Msg1, the MPDCCH, and the second signaling are all repeatedly sent for the quantity of repetitions in the non-actual CE-level (the second CE-level). The third signaling sent by the UE to the network side carries indication information indicating the actual CE-level (the first CE-level), so that a quantity of repetitions of subsequent signaling exchange (the fourth signaling and the fifth signaling) can be restored to the quantity that is of repetitions and that corresponds to the actual CE-level (the first CE-level).

In this embodiment, the UE may determine, based on the first CE-level, the first UAC parameter corresponding to the first CE-level. When determining, based on the first UAC parameter, whether the access of the UE is barred, the UE simultaneously enables the access controller. When attempting to access the communications network, the UE may determine whether the access controller reaches the preset threshold. If determining that the access controller reaches the preset threshold, the UE may determine, based on the second CE-level, the second UAC parameter corresponding to the second CE-level, where the second CE-level is different from the first CE-level. Then, the UE determines, based on the second UAC parameter, whether the access of the UE is barred. If the UE successfully accesses the communications network, a quantity of repetitions of exchanged signaling such as the first signaling and the second signaling between the UE and the network side is the quantity that is of repetitions and that corresponds to the non-actual CE-level, namely, the second CE-level. The third signaling sent by the UE to the network side carries the indication information of the actual CE-level, namely, the first CE-level, and subsequent exchanged signaling such as the fourth signaling and the fifth signaling are repeatedly sent for the quantity that is of repetitions and that corresponds to the first CE-level. When failing attempting to access a communications system based on the first CE-level, the UE may use the CE-level rollback access mechanism in this embodiment, and roll back from the first CE-level to the second CE-level, so that the UE may attempt to access the communications system based on another CE-level, and an access possibility of some UEs such as UEs of a maximum transmit power in a low class can be improved.

The foregoing is an embodiment of an access control method, and another embodiment of the following access control method is to configure a UAC parameter based on a class (which may also be referred to as a level) of a transmit power. A maximum transmit power is considered in UAC, and the maximum transmit power is used as one of factors of AC mapping, or as one of factors of a differentiated parameter configuration of the UAC, so that UEs with different transmit power classes can be controlled in the UAC to implement more effective congestion control. Compared with a UE of a maximum power of 23 dBm, a UE of a maximum power of 14 dBm usually has a larger quantity of repetitions, that is, a higher CE-level. Therefore, the UE of the maximum transmit power of 14 dBm may occupy more resources to access a network. According to a CE-level configuration principle, such a UE and the UE of 23 dBm are mixed and controlled together to perform access attempts. There is a higher probability that such a UE with a low power is barred from accessing the network. However, such a UE may exist widely, a quantity of connections of the UE (such as a smart sensor in machine type communication) may be very large, and an application scenario of the UE is different from an application scenario of a common terminal device (such as a mobile terminal such as a mobile phone or a tablet computer). If the application scenario of the UE is controlled together with the common scenario, data collection efficiency in a scenario such as machine type communication may be affected. Therefore, the congestion control may be separately performed based on a transmit level in the following embodiments, which is equivalent to performing the congestion control based on an application scenario. When a machine type communication scenario (MTC scenario) is relatively important, the UE with the low transmit power may be adjusted on a network side.

Figure 5:
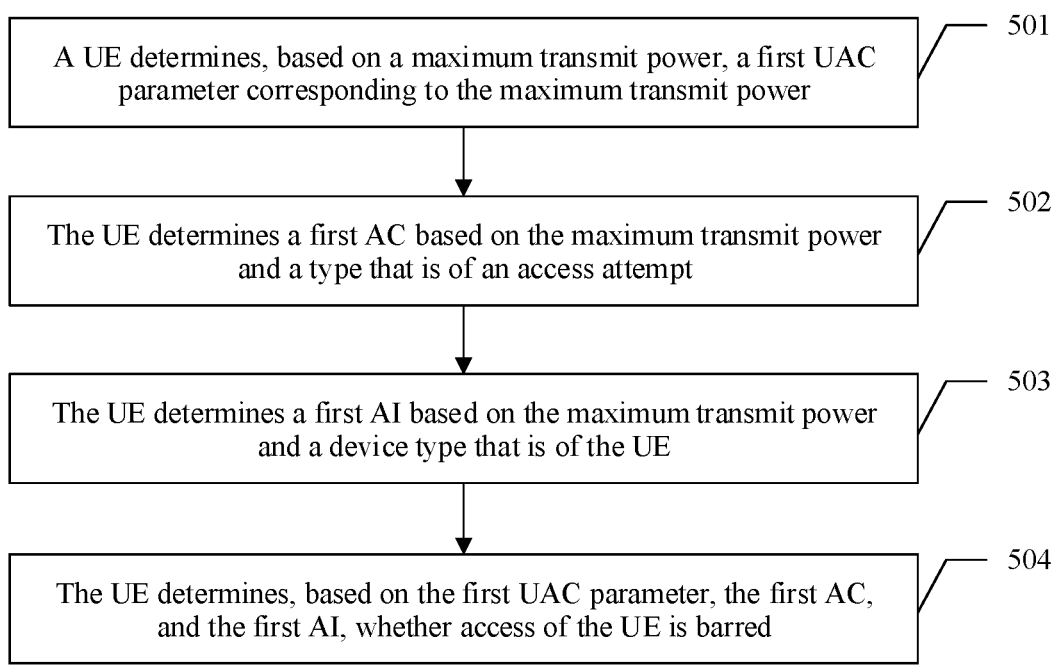
FIG. 5 is a schematic diagram of another embodiment of an access control method according to an embodiment of this application.

FIG. 5 is a schematic diagram of the another embodiment of the access control method. In the following embodiment, the another embodiment of the access control method includes the following steps.

501. A UE determines, based on the maximum transmit power, a first UAC parameter corresponding to the maximum transmit power.

In this embodiment, the UE may determine, based on the maximum transmit power, the first UAC parameter corresponding to the maximum transmit power, and may indicate the maximum transmit power (UE maximum transmission power) of the UE in the first UAC parameter. For example, in UAC configuration, one bit (bit) may be used for indication information, so that the UE may determine the maximum transmit power of the UE based on the indication information in the UAC parameter.

For example, the maximum transmit power of the UE is classified into two classes. A maximum transmit power greater than 20 dBm is a high transmit power class, which may also be referred to as a normal transmit power class (normal power class). Usually, a maximum transmit power that is commonly used is 23 dBm. A maximum transmit power less than 20 dBm is a low transmit power class (low power class). Referring to Example 7 below, the UE may use "UE-power=TRUE" of the UAC parameter to indicate the low transmit power class, and use "U-power=FALSE" of the UAC parameter to indicate the high transmit power. In this case, when reading the indication information "UE-power=TRUE", the UE may determine that a UAC parameter that carries the indication information "UE-power=TRUE" is a UAC parameter with the low transmit power. When reading the indication information "U-power=FALSE", the UE may determine that a UAC parameter that carries the indication information "U-power=FALSE" is a UAC parameter with the high transmit power.

Example 8

```
UAC-BarringPerCat ::= SEQUENCE {
    UE-Power              ENUMERATED{TRUE}
    AccessCategory        INTEGER (1... maxAccessCat-1),
    uac-barringInfoSetIndex    INTEGER (1 ... maxBarringInfoSet)
}
```

The English words involved in Example 8 above are translated as follows. For words that repeatedly appear, refer to the foregoing examples. Details are not described herein again.

UE-Power: UE-Power indicates information about the maximum power of the UE.

maxAccessCat: maxAccessCat indicates a maximum quantity of ACs uac-barringInfoSetIndex: uac-barringInfoSetIndex indicates uac restriction information set identifier.

In addition, a correspondence between the UAC and the maximum transmit power may be sequential correspondence. To be specific, the first UAC parameter corresponds to CE-level 1, the second UAC parameter corresponds to CE-level 2, and so on. Referring to Example 9 below, "uac-BarringPerPowerList" in Example 9 includes a plurality of "UAC-BarringPerPower"s. In other words, "uac-BarringPerPowerList" is a list of the plurality of "UAC-BarringPerPower"s. Each "UAC-BarringPerPower" represents a UAC parameter, and corresponds to a value of a maximum transmit power.

Example 9

```
UAC-BarringPerPLMN-List ::=    SEQUENCE (SIZE(1 ... maxPLMN)) OF
UAC-BarringPerPLMN
    -- maxPLMN = 12
    UAC-BarringPerPLMN ::=    SEQUENCE {
        plmn-IdentityIndex        INTEGER (1 ... maxPLMN),
        uac-BarringPerPowerList    UAC-BarringPerPowerList
    }
    UAC-BarringPerPowerList :: SEQUENCE (SIZE(1 ... maxPowerlevel)) of UAC-
BarringPerPower
        UAC-BarringPerPower :: = SEQUENCE {
            uac-BarringPerCatList    UAC-BarringPerCatList
        }
```

For Chinese translation of English words involved in Example 9, refer to the foregoing examples.

502. The UE determines a first AC based on the maximum transmit power, and a type that is of an access attempt.

In this embodiment, the UE may determine the first AC based on the maximum transmit power, and the type that is of the access attempt. Table 5 below is a mapping table in which the UE determines the first AC based on the maximum transmit power, and the type that is of the access attempt.

TABLE 5

| Access Category number | Conditions related to UE | Type of access attempt |
| --- | --- | --- |
| 0 | All | MO signaling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signaling resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that does not belong to any other Access Categories |
| 8 | UE is a low Tx power UE | All except for Emergency |
| 9-31 | | Reserved standardized Access Categories |
| 32-63 (NOTE 2) | All | Based on operator classification |

In Table 5, AC 8 is introduced for the low transmit power. Other ACs are service-related ACs.

If an access attempt complies with a plurality of ACs, the UE preferentially maps the access attempt to the service-related AC. If the UE is barred from accessing the network for the first time, the UE preferentially maps the access attempt to the power-related AC when attempting to access the network again. For example, if the access attempt to be initiated by the UE is not only SMS information but also an attempt initiated in a maximum transmit power in a low class, an AC of the UE may correspond to the AC-8 or AC-6. In this case, the UE first determines the AC-6 corresponding to the access attempt. If the access attempt corresponding to the AC-6 is barred, the UE maps the AC of the access attempt to the AC-8 when performing a next access attempt.

503. The UE determines a first AI based on the maximum transmit power and a UE configuration.

In this embodiment, the UE may determine the first AI based on the maximum transmit power and the UE configuration. A mapping method is similar to that in step 502. Table 6 below is a mapping table in which the UE determines the first AI based on the maximum transmit power and the UE configuration.

TABLE 6

| Access Identity number | UE configuration |
| --- | --- |
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3 | UE is a low transmit power UE |
| 4-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

In Table 6, AI-3 corresponds to a UE of a maximum transmit power in a relatively low class. In other words, UEs corresponding to AI values include the UE of the maximum transmit power in the relatively low class.

504. The UE determines, based on the first UAC parameter, the first AC, and the first AI, whether the access of the UE is barred.

The UE determines a corresponding UAC parameter based on the maximum power of the UE, and determines, based on AC and AI values corresponding to the access attempt, and the corresponding UAC parameter, whether the access is barred.

The step is similar to step 204 and step 306 in the foregoing embodiments, and details are not described herein again.

After obtaining values of the first UAC parameter, the first AC, and the first AI, the UE may determine, based on the three values, whether the access of the UE is barred.

It should be noted that there is no absolute sequence between step 501 to step 503 in this embodiment. Step 502 may be performed first, and then steps 501 and 503 are performed. Alternatively, step 503 may be performed first, and then step 503 and step 501 are performed. This is not specifically limited herein.

In addition, in this embodiment, steps 502 and 503 are optional steps. To be specific, the UE may alternatively determine, based only on the first UAC parameter, whether the access of the UE is barred, or the UE may determine, based on the first UAC parameter and the first AC, whether the access of the UE is barred, or the UE may determine, based on the first UAC parameter and the first AI, whether the access of the UE is barred. This is not specifically limited herein.

For example, the UE may determine, based on the first UAC parameter and the first AI, whether the access of the UE is barred. The UE determines the corresponding AC value based on the access attempt. The AI value is a default value, and the default value may be a value stored on a UE side based on a capability of the UE. For example, the UE is a UE supporting a voice conversation. Assuming that the voice conversation is a service customized by an operator, when the UE registers with the network, the UE may store a default AI=15. Therefore, when determining whether the access attempt is barred, the UE only needs to obtain the AC value through mapping, and does not need to obtain the AI value through mapping. The value of the maximum power is used to determine a UAC corresponding to the value of the maximum power. For example, a group of UAC parameters is configured on the network side, where each UAC parameter corresponds to a value of the maximum power (there is a group of UACs corresponding to 23 dBm, and a group of UACs corresponding to 14 dBm). The UE determines, based on the value of the maximum power of the UE, a group of UACs that the UE should use. Based on the AC value obtained through mapping and the UAC parameters configured on the network side, the UE can determine whether the access of the UE is barred.

In addition, an example in which the UE determines, based on the first UAC parameter and the first AI, whether the access of the UE is barred is similar to the foregoing example, and the AC value is set to a default value.

In this embodiment, a level of the maximum transmit power may be learned of based on the first UAC parameter. In addition, the values of the first AC and the first AI represent the maximum transmit power. Therefore, when it is determined, based on the first AC, the first AI, and the first UAC parameter, whether the access is barred, UEs with different maximum transmit powers may be distinguished. In this way, access of the UEs with different maximum transmit powers can be adjusted based on congestion on the network side. When congestion occurs on the network side, the access attempt can be performed based on a maximum transmit power at a relatively low level. In this way, an occupied resource usage amount is relatively small, thereby controlling a network resource usage amount.

The foregoing is an embodiment of an access control method, and the following is another embodiment of an access control method. It should be noted that steps 601 and 602 in this embodiment are similar to steps 201 and 202 in the foregoing embodiment, and steps 604 to 606 are similar to steps 502 to 504 in the foregoing embodiment. Details are not described herein again.

Figure 6:
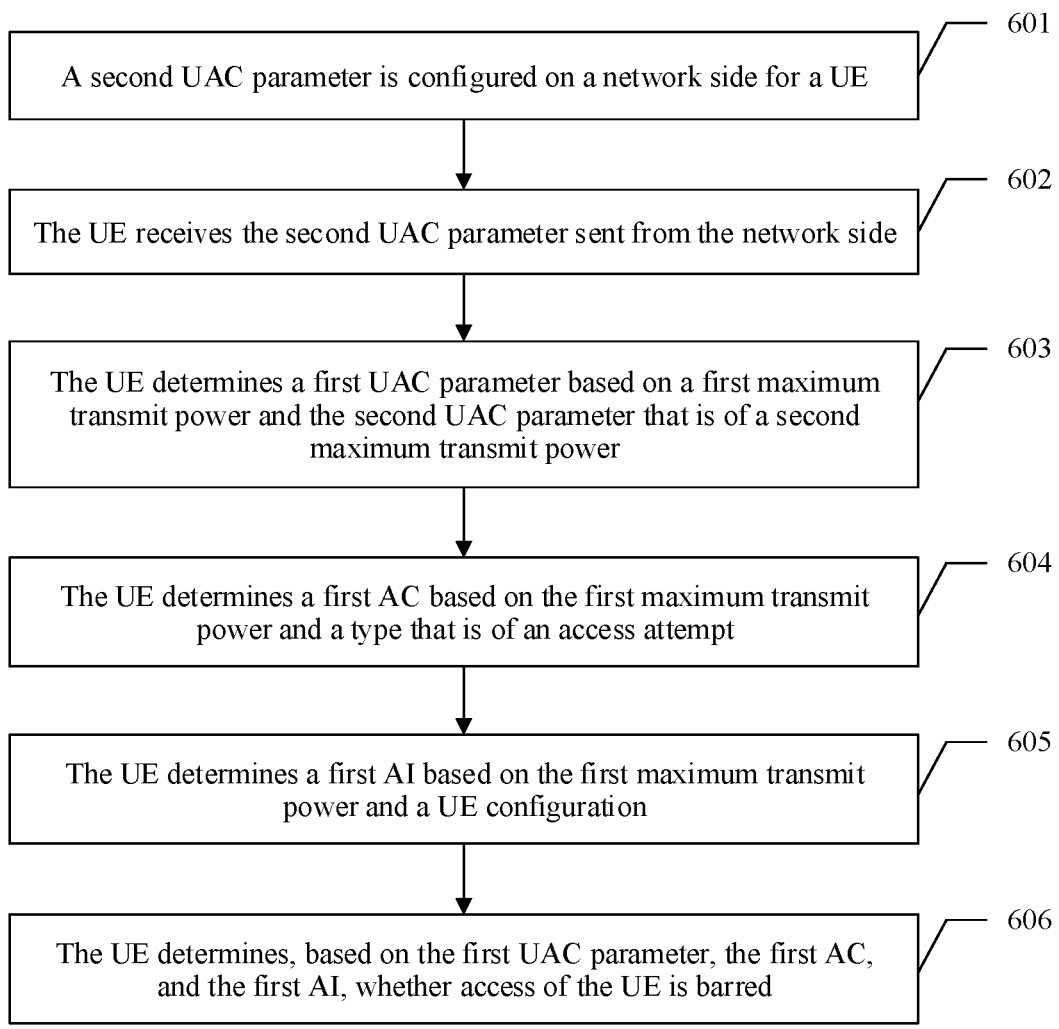
FIG. 6 is a schematic diagram of another embodiment of an access control method according to an embodiment of this application.

FIG. 6 shows the another embodiment of the access control method. The another embodiment of the access control method includes the following steps.

601. A second UAC parameter is configured on a network side for a UE.

In this embodiment, the network side may be a base station, or may be a small cell, a macro site, a micro site, a core network device, or the like. This is not specifically limited herein.

602. The UE receives the second UAC parameter sent from the network side.

603. The UE determines a first UAC parameter based on a first maximum transmit power and the second UAC parameter that is of a second maximum transmit power.

When values of parameters in the first UAC parameter corresponding to the first maximum transmit power are incomplete, and the UE needs to determine whether the UE can access a communications network of a 5G system based on the first UAC parameter, after obtaining the second UAC parameter, the UE may determine, based on the first maximum transmit power and the second UAC parameter that corresponds to the second maximum transmit power, the first UAC parameter corresponding to the first maximum transmit power. Because values of parameters in the second UAC parameter are complete, the values of the parameters in the first UAC parameter may be determined according to the following two methods.

Method 1: The UE determines the first UAC parameter based on the second UAC parameter of the second maximum transmit power, the first maximum transmit power, and a differential value between the second UAC parameter and the first UAC parameter.

Referring to Example 9, in Example 9, for example, UAC-BarringPerPowerList is a list with a maximum length of maxPowerlevel. A list length in a range of 1 to maxBarringInfoSet may be configured according to "(SEQUENCE (SIZE (1 . . . maxBarringInfoSet)) OF UAC-BarringInfoSet)" in Example 2. Assuming that the list length is 2, it indicates that the example list includes a UAC parameter in a first maximum transmit power class, and a UAC parameter in a second maximum transmit power class.

Differential configuration may be performed on a UAC corresponding to a maximum transmit power in a low class based on a differential value between the UAC corresponding to the maximum transmit power in the low class and a UAC of a maximum transmit power in a high class. In this embodiment, the UAC parameter of the first maximum transmit power is used as a reference. Therefore, a difference between the UAC corresponding to the second maximum transmit power and the UAC parameter corresponding to the first maximum transmit power is configured in the UAC parameter of the second maximum transmit power.

The step is similar to step 203 in the foregoing embodiment, and details are not described herein again.

Method 2: The UE determines the first UAC parameter based on the second UAC parameter of the second maximum transmit power, the first maximum transmit power, and a scale factor.

In Method 2, there are two manners of configuring the scale factor.

1. The UAC of the UE of the maximum transmit power in the low class (the first maximum transmit power in this embodiment) has a scale factor compared with the UAC of the UE of the maximum transmit power in the high class (the second maximum transmit power in this embodiment), and the scale factor may be configured in broadcast signaling. For example, in a common configuration of a normal UAC (the normal UAC is the second UAC in this embodiment), probability=0.4, and time=8s, multiplied by a scale factor 0.6, to obtain probability=0.4×0.6, and time=8×0.6 in the UE of the maximum transmit power in the low class (the first maximum transmit power in this embodiment). The scale factor may also be applied to a different restriction information set of a UAC. The scale factor and the UAC may be configured in an identical SIB (for example, both are configured in an SIB 2), or may be separately configured in different SIBs (for example, the other one is configured in an SIB 1).

In addition, the scale factor may also be a value predefined in a protocol. Content related to this part is described in detail in step 203 in the foregoing embodiment, and details are not described herein again.

2. When the UE initiates access, the scale factor used can be related to a class of the maximum transmit power of the UE. A UE of the maximum transmit power in the low class (a UE of the first maximum transmit power in this embodiment)/a UE of the maximum transmit power in the high class (a UE of the second maximum transmit power in this embodiment)=the scale factor. The UE considers using both the scale factor and a broadcast UAC parameter. For example, the UE obtains the scale factor through calculation, multiplies the broadcast UAC parameter by the scale factor, to determine whether the access is barred. For example, UAC parameters of CE-level 0, 1, 2, and 3 are broadcast on the network side. For a UE of 14 dBm, a scale factor=14/23, approximately 0.6. Parameters in the CE-level 0 corresponding to the UE of the first maximum transmit power is obtained by multiplying parameters in a broadcast CE-level 0 by the scale factor. For example, if probability=0.5 and time=7 in the broadcast CE-level 0, probability=0.5×0.6 and time=7×0.6 in the CE-level 0 corresponding to the UE.

In this embodiment, a method for determining the first UAC parameter based on the first maximum transmit power and the second UAC parameter that is of the second maximum transmit power is not specifically limited.

604. The UE determines a first AC based on the first maximum transmit power, and a type that is of an access attempt.

605. The UE determines a first AI based on the first maximum transmit power and a UE configuration.

606. The UE determines, based on the first UAC parameter, the first AC, and the first AI, whether the access of the UE is barred.

It should be noted that, step 604 and step 605 in this embodiment are optional steps, and the UE may alternatively determine, based only on the first UAC parameter, whether the access of the UE is barred, or the UE may alternatively determine, based on the first UAC parameter and one of an AI or an AC, whether the access of the UE is barred. This is not specifically limited herein.

In this embodiment, the UE determines, based on the first AC, the first AI, and the first maximum transmit power, and the second UAC parameter that is of the second maximum transmit power, whether the access of the UE is barred. Therefore, when the UE cannot directly learn of the first UAC parameter corresponding to the first maximum transmit power, the first UAC parameter may be determined based on the complete second UAC parameter configured for another maximum transmit power, so that the UE may learn of the maximum transmit power of the UE. Whether to allow the UE to access the network is determined on the network side based on a class of the maximum transmit power of the UE. If the maximum transmit power is high, resources may be saved on the network side by barring the access of the UE, so that more UEs can access the network. Further, in this embodiment, because a differential configuration method or a scale factor method is used, resources can be further saved.

Figure 7:
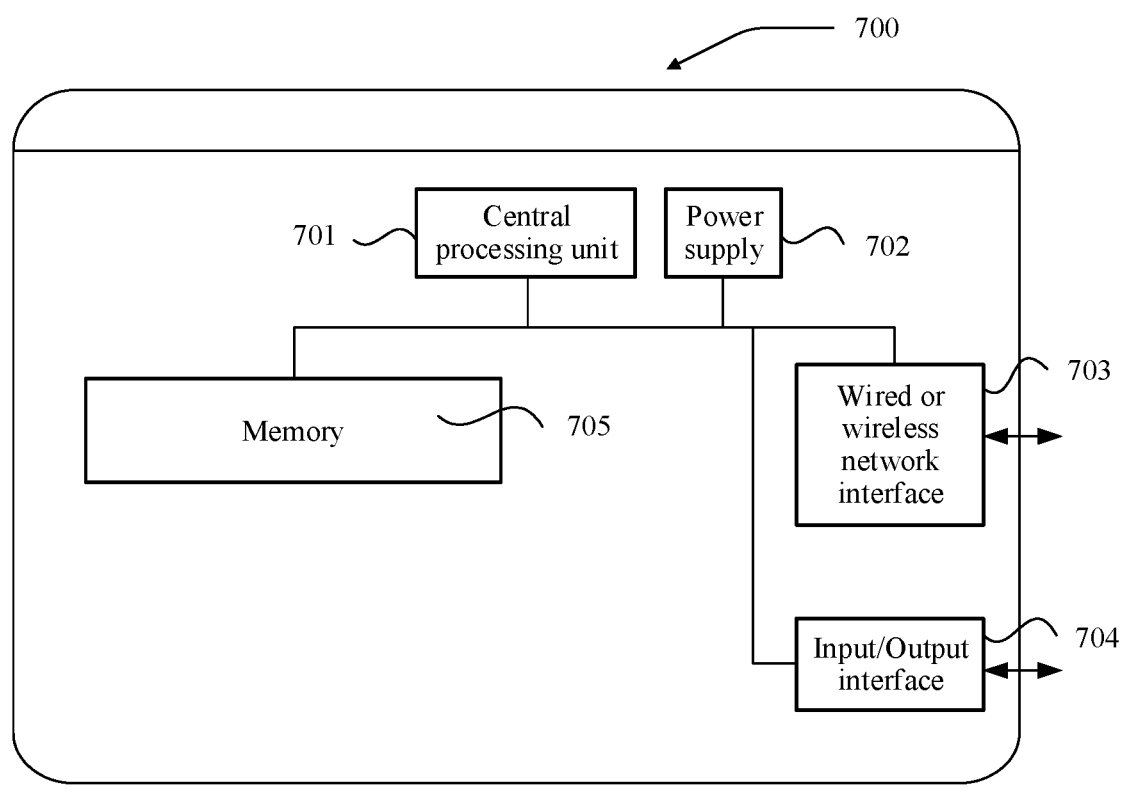
FIG. 7 is a schematic diagram of an embodiment of a communications device according to an embodiment of this application.

The foregoing describes the access control method in the embodiments of this application. The following describes a communications device in the embodiments of this application. Referring to FIG. 7, an embodiment of an access network element in the embodiments of this application includes the following content.

The communications device 700 may have a relatively large difference due to different configurations or performance, and may include one or more central processing units (central processing units, CPU) 701 (for example, one or more processors) and a memory 705. The memory 705 stores data or one or more application programs.

The memory 705 may be volatile storage or persistent storage. The programs stored in the memory 705 may include one or more modules, and each module may include a series of instruction operations for a server. Further, the central processing units 701 may be configured to: communicate with the memory 705, and perform, on the communications device 700, the series of instruction operations that are in the memory 705.

The communications device 700 may further include one or more power supplies 702, one or more wired or wireless network interfaces 703, one or more input/output interfaces 704, and/or one or more operating systems such as Windows Server™, Mac OS X™, Unix™, Linux™, and FreeBSD™.

A procedure executed by the central processing unit 701 in the communications device 700 in this embodiment is similar to the method procedures described in the embodiments shown in FIG. 1 to FIG. 6. Details are not described herein again.

A beneficial effect of this embodiment of this application is that the communications device may determine, based on a first AC, a first AI, and a UAC parameter that corresponds to a first CE-level and that is determined based on the first CE-level, whether access of a UE is barred. Because a first UAC is determined based on the first CE-level, a network system may control the access of the UE based on a CE-level of the UE. A high CE-level indicates a large quantity of access repetitions in the CE-level, and a large quantity of resources to be used. If such a communications device accesses the network, more other communications devices cannot access the network system. Therefore, a communications device with a high CE-level may be barred from accessing the network, so that more communications devices can access the network. In this way, UAC parameters may be separately configured for communications devices based on a resource usage amount in access control, to implement more effective congestion control.

Figure 8:
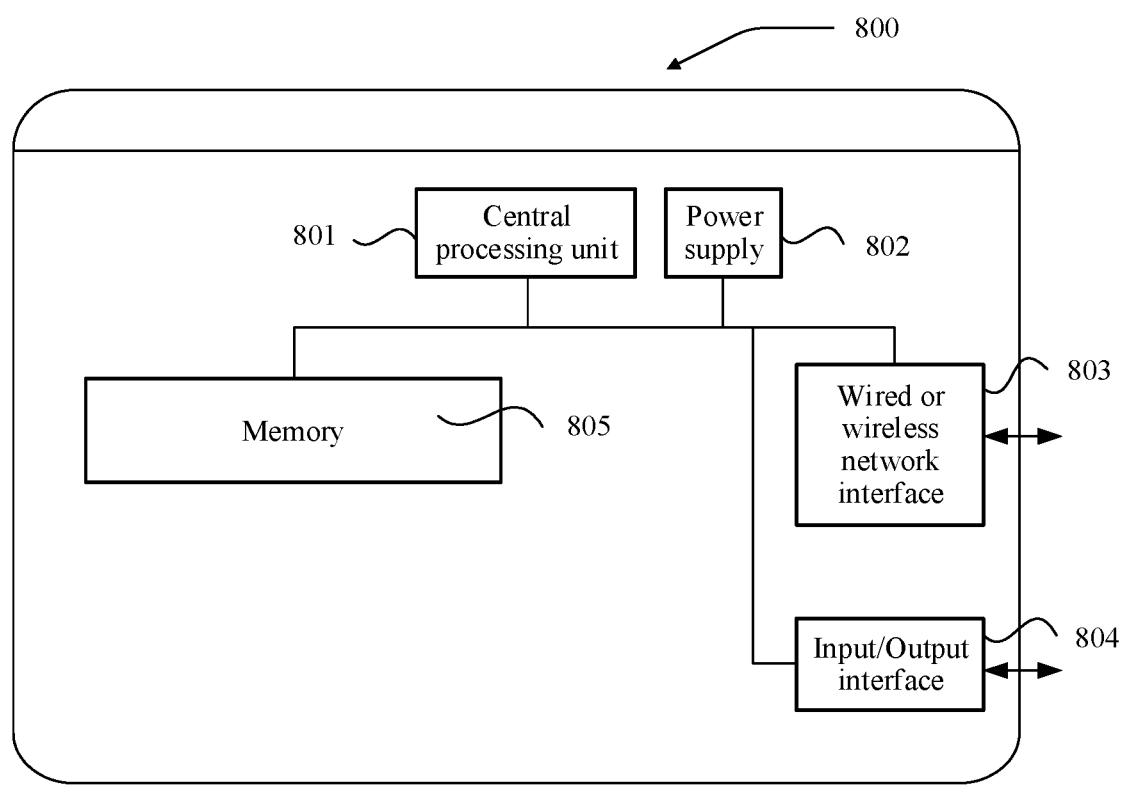
FIG. 8 is a schematic diagram of an embodiment of a base station according to an embodiment of this application.

Referring to FIG. 8, an embodiment of a base station in the embodiments of this application includes the following content.

The base station 800 may have a relatively large difference due to different configurations or performance, and may include one or more central processing units (central processing units, CPU) 801 (for example, one or more processors) and a memory 805. The memory 805 stores data or one or more application programs.

The memory 805 may be volatile storage or persistent storage. The programs stored in the memory 805 may include one or more modules, and each module may include a series of instruction operations for a server. Further, the central processing units 801 may be configured to: communicate with the memory 805, and perform, on the base station 800, the series of instruction operations that are in the memory 805.

The base station 800 may further include one or more power supplies 802, one or more wired or wireless network interfaces 803, one or more input/output interfaces 804, and/or one or more operating systems such as Windows Server™, Mac OS X™, Unix™, Linux™, and FreeBSD™.

A procedure executed by the central processing unit 801 in the base station 800 in this embodiment is similar to the method procedures described in the embodiments shown in FIG. 1 to FIG. 6. Details are not described herein again.

A beneficial effect of this embodiment of this application is that after a UE accesses a base station based on a second CE-level, the base station may perform signaling transmission based on an actual first CE-level obtained based on information that is about the first CE-level and that is sent by the UE. Therefore, after being barred from accessing the base station by using one CE-level, the UE attempts to access the base station based on another higher CE-level, so that more UEs access the base station, thereby improving practicability of the base station.

It may be clearly understood by persons skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for enabling a computer device (which may be a personal computer, a server, a network device, or the like) to perform all or some of the steps of the method described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or a compact disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An access control method, comprising:
   determining, by a communications apparatus based on a first coverage enhancement level (CE-level), a first unified access control (UAC) parameter corresponding to the first CE-level;
   determining, by the communications apparatus based on the first UAC parameter, whether access of the communications apparatus is barred; and
   when the communications apparatus determines, based on the first UAC parameter, that the access is barred, determining, by the communications apparatus based on a second UAC parameter corresponding to a second CE-level, whether the access is barred, wherein the second CE-level is higher than the first CE-level.

2. The method according to claim 1, wherein
   the determining, by the communications apparatus based on the first UAC parameter, whether the access is barred further comprises:
   before an access timer expires, determining, by the communications apparatus based on the first UAC parameter, whether the access is barred; and
   the determining, by the communications apparatus based on a second UAC parameter corresponding to a second CE-level, whether the access is barred comprises:
   after the access timer expires, determining, by the communications apparatus based on the second UAC parameter corresponding to the second CE-level, whether the access is barred.

3. The method according to claim 1, wherein the method further comprises:
   when the communications apparatus determines, based on the second UAC parameter, that the access is not barred, performing, by the communications apparatus, the access based on the second CE-level;
   sending, by the communications apparatus, information about the first CE-level; and
   after the sending, by the communications apparatus, information about the first CE-level, performing, by the communications apparatus, signaling transmission based on the first CE-level.

4. The method according to claim 1, wherein the method further comprises:
   determining, by the communications apparatus, a first access category AC based on the first CE-level and a type that is of an access attempt of the access; and
   the determining, by the communications apparatus based on the first UAC parameter, whether access of the communications apparatus is barred further comprises:
   determining, by the communications apparatus based on the first UAC parameter and the first AC, whether the access is barred.

5. The method according to claim 4, wherein the method further comprises:
   determining, by the communications apparatus, a first access identity AI based on the first CE-level and a configuration that is of the communications apparatus; and
   the determining, by the communications apparatus based on the first UAC parameter and the first AC, whether the access of the communications apparatus is barred further comprises:
   determining, by the communications apparatus based on the first UAC parameter, the first AC, and the first AI, whether the access is barred.

6. The method according to claim 1, wherein the method further comprises:
   determining, by the communications apparatus, a first access identity AI based on the first CE-level and a configuration that is of the communications apparatus; and
   the determining, by the communications apparatus based on the first UAC parameter, whether access of the communications apparatus is barred further comprises:
   determining, by the communications apparatus based on the first UAC parameter and the first AI, whether the access is barred.

7. The method according to claim 1, wherein the determining, by a communications apparatus and user equipment based on a first coverage enhancement level CE-level, a first unified access control UAC parameter comprises:
   determining, by the communications apparatus, the first UAC parameter based on the first CE-level and a third UAC parameter that corresponds to a third CE-level.

8. The method according to claim 7, wherein the determining, by the communications apparatus, the first UAC parameter based on the first CE-level and a third UAC parameter that corresponds to a third CE-level further comprises:
   determining, by the communications apparatus, the first UAC parameter based on the third UAC parameter, the first CE-level, and a differential value between the third UAC parameter and the first UAC parameter.

9. The method according to claim 7, wherein the determining, by the communications apparatus, the first UAC parameter based on the first CE-level and a third UAC parameter that is of a third CE-level further comprises:
   determining, by the communications apparatus, the first UAC parameter based on the third UAC parameter, the first CE-level, and a scale factor.

10. The method according to claim 9, wherein the scale factor comprises:
    a scale factor configured by using a broadcast message, or a predefined scale factor.

11. An access control method, comprising:
    configuring, by a communications apparatus, a first unified access control (UAC) parameter for user equipment (UE) based on a first coverage enhancement level (CE-level);
    after the UE accesses the communications apparatus based on a second CE-level, receiving, by the communications apparatus, information that is about the first CE-level and that is sent by the UE, wherein the second CE-level is higher than the first CE-level; and
    performing, by the communications apparatus, signaling transmission based on the first CE-level.

12. A communications apparatus, comprising a processor, wherein the processor is coupled to a memory, and reads and executes instructions that are stored in the memory, to implement:
    determining, based on a first coverage enhancement level (CE-level), a first unified access control (UAC) parameter corresponding to the first CE-level;
    determining, based on the first UAC parameter, whether access of the communications apparatus is barred; and
    when the communications apparatus determines, based on the first UAC parameter, that the access is barred, determine, based on a second UAC parameter corresponding to a second CE-level, whether the access is barred, wherein the second CE-level is higher than the first CE-level.

13. The communications apparatus according to claim 12, wherein the processor is further configured to: determine, before an access timer expires and based on the first UAC parameter, whether the access is barred; and determine, after the access timer expires and based on the second UAC parameter corresponding to the second CE-level, whether the access is barred.

14. The communications apparatus according to claim 13, wherein the processor is further configured to: if determining, based on the second UAC parameter, that the access is not barred, perform the access based on the second CE-level; send information about the first CE-level; and perform signaling transmission based on the first CE-level after sending the information about the first CE-level.

15. The communications apparatus according to claim 12, wherein the processor is further configured to: determine a first access category AC based on the first CE-level and a type that is of an access attempt of the access; and determine, based on the first UAC parameter and the first AC, whether the access is barred.

16. The communications apparatus according to claim 15, wherein the processor is further configured to: determine a first access identity AI based on the first CE-level and a configuration that is of the communications apparatus; and determine, based on the first UAC parameter, the first AC, and the first AI, whether the access is barred.

17. The communications apparatus according to claim 16, wherein the processor is further configured to determine the first UAC parameter based on the first CE-level and a third UAC parameter that corresponds to a third CE-level.

18. The communications apparatus according to claim 12, wherein the processor is further configured to: determine a first access identity AI based on the first CE-level and a configuration that is of the communications apparatus; and determine, based on the first UAC parameter and the first AI, whether the access is barred.

* * * * *